(12) United States Patent  
Kwon et al.

(10) Patent No.: US 8,970,942 B2
(45) Date of Patent: Mar. 3, 2015

(54) ELECTROPHORETIC DISPLAY DEVICE AND METHOD OF FABRICATING THE SAME

(75) Inventors: Oh-Nam Kwon, Gyeonggi-do (KR); Nack-Bong Choi, Gyeonggi-do (KR); Choon-Ho Park, Gyeonggi-do (KR); Yu-Sok Lim, Gyeonggi-do (KR); Jong-Kwon Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 374 days.

(21) Appl. No.: 12/840,685

(22) Filed: Jul. 21, 2010

(65) Prior Publication Data

US 2011/0026099 A1 Feb. 3, 2011

(30) Foreign Application Priority Data

Aug. 3, 2009 (KR) .................. 10-2009-0071190

(51) Int. Cl.
*G02B 26/00* (2006.01)
*G02B 26/08* (2006.01)
*G02F 1/29* (2006.01)
*G02F 1/167* (2006.01)
*G02F 1/1335* (2006.01)
*G02F 1/163* (2006.01)

(52) U.S. Cl.
CPC .......... *G02F 1/167* (2013.01); *G02F 1/133514* (2013.01); *G02F 2001/1635* (2013.01)
USPC ............................ 359/296; 359/295; 359/298

(58) Field of Classification Search
USPC .......... 359/290–292, 295, 296, 298, 237, 242
See application file for complete search history.

(56) References Cited

U.S. PATENT DOCUMENTS 6,778,312 B2   8/2004   Kawai
7,705,810 B2 *  4/2010   Choi et al. .................. 345/77

(Continued)

FOREIGN PATENT DOCUMENTS

CN   101093352 A   12/2007
CN   101308310 A   11/2008

(Continued)

OTHER PUBLICATIONS

3rd Notification of Office Action Oct. 8, 2013 from The State Intellectual Property Office of China in counterpart Chinese application No. 201010243476.X.

(Continued)

*Primary Examiner* — Stephone B Allen
*Assistant Examiner* — Brandi Thomas
(74) *Attorney, Agent, or Firm* — Morgan, Lewis & Bockius LLP

(57) ABSTRACT

An electrophoretic display device includes a switching element on a substrate including a display area having a pixel region and a non-display area at a periphery of the display area, a passivation layer covering the switching element, a pixel electrode on the passivation layer and connected to the switching element, an electrophoresis film on the pixel electrode and including an ink layer and a base film, wherein the ink layer includes a plurality of charged particles, and the base film is formed of polyethylene terephthalate, a common electrode for generating an electric field with the pixel electrode to drive the electrophoresis film, and a color filter layer directly on the electrophoresis film, wherein the color filter layer is formed under temperatures of less than 100 degrees of Celsius.

16 Claims, 27 Drawing Sheets

(56) References Cited

U.S. PATENT DOCUMENTS

| | | | |
|---|---|---|---|
| 2004/0085618 A1* | 5/2004 | Kawai | 359/296 |
| 2005/0041183 A1* | 2/2005 | Lee | 349/106 |
| 2008/0285114 A1 | 11/2008 | Lee et al. | |
| 2008/0304134 A1 | 12/2008 | Ban | |
| 2009/0206339 A1* | 8/2009 | Park et al. | 257/59 |
| 2010/0073279 A1* | 3/2010 | Kwon et al. | 345/107 |

FOREIGN PATENT DOCUMENTS

| | | | | |
|---|---|---|---|---|
| JP | 07-097543 | | 4/1995 | |
| JP | 07-97543 | * | 4/1995 | C09D 11/10 |
| JP | 2008-003420 | * | 1/2008 | G02B 5/20 |
| JP | 2008-129599 | | 6/2008 | |
| KR | 1020080100584 A | | 11/2008 | |
| TW | 200537694 | | 11/2005 | |

OTHER PUBLICATIONS

Office Action dated Feb. 1, 2013 from the Korean Intellectual Property Office in counterpart Korean application No. 10-2009-0071190.
Examination Statement dated Dec. 19, 2013 from the Taiwan Advance Patent & Trademark Office in counterpart Taiwanese application No. 099122393.

* cited by examiner

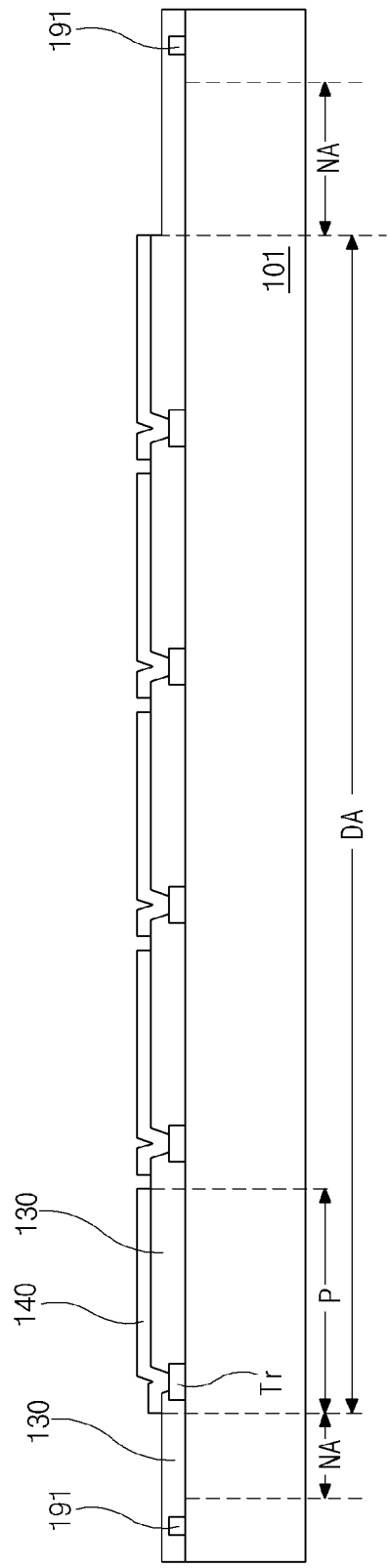
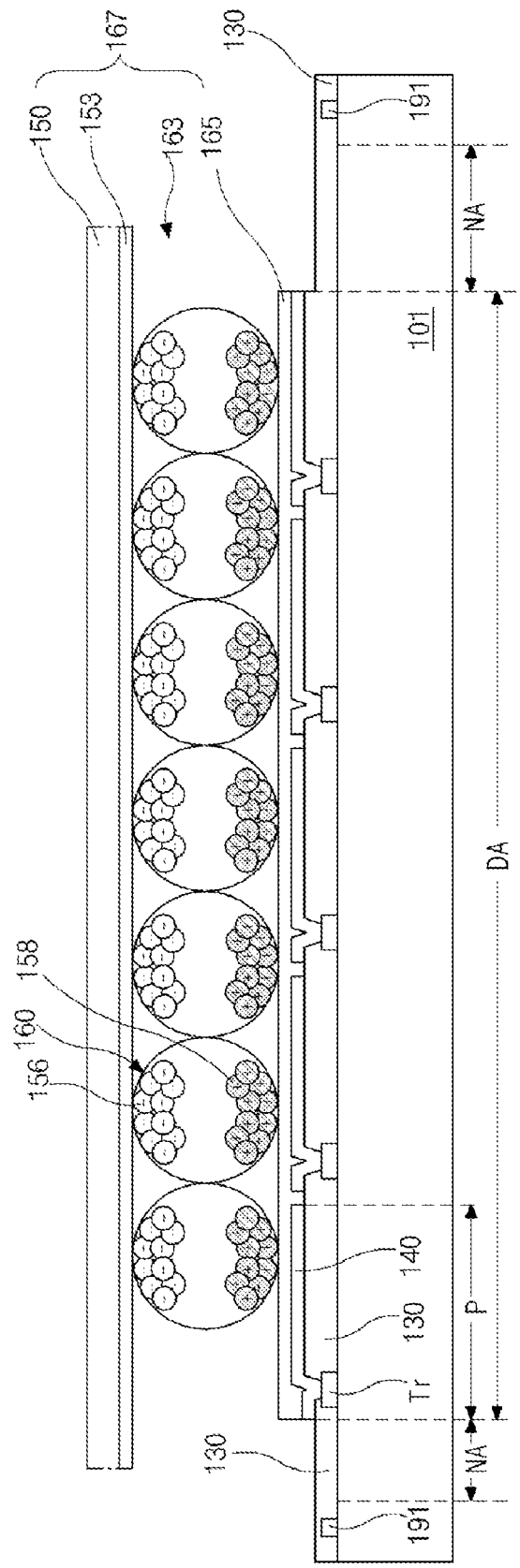

ELECTROPHORETIC DISPLAY DEVICE AND METHOD OF FABRICATING THE SAME

The present invention claims the benefit of Korean Patent Application No. 10-2009-0071190, filed in Korea on Aug. 3, 2009, which is hereby incorporated by reference in its entirety.

BACKGROUND OF THE INVENTION

1. Field of the Invention

The present invention relates to an electrophoretic display device, and more particularly, to an electrophoretic display device and a method of fabricating the same.

2. Discussion of the Related Art

In general, liquid crystal display (LCD) devices, plasma display panels (PDPs) and organic electro-luminescence displays (OELDs) have been widely used for display devices. However, recently, to meet rapidly diversified consumers' requirements, various display devices has been introduced.

Particularly, properties of a light weight, thin profile, high efficiency and function for displaying full color moving images have been required in the display devices. To satisfy the properties, electrophoretic display devices, which have merits of papers and other display devices, have been suggested and researched. The electrophoretic display devices use a phenomenon that charged particles move to an anode or a cathode. The electrophoretic display devices have advantages in a contrast ratio, a response time, a full color display, costs, portability, and so on. Differently from the LCD devices, the electrophoretic display devices do not require a polarizer, a backlight unit, a liquid crystal layer, and so on. Accordingly, the electrophoretic display devices have an advantage in production costs.

FIG. 1 is a schematic view of a related art electrophoretic display device to explain a driving principle of the same. In FIG. 1, the related art electrophoretic display device 1 includes a first substrate 11, a second substrate 36 and an ink layer 57 interposed therebetween. The ink layer 57 includes capsules 63, and each capsule 63 has a plurality of white-dyed particles 59 and a plurality of black-dyed particles 61 therein. The white-dyed particles 59 and the black-dyed particles 61 are negatively and positively charged by a condensation polymerization reaction, respectively.

A plurality of pixel electrodes 28, which are connected to a plurality of thin film transistors (not shown), are formed on the first substrate 11, and each pixel electrode 28 is disposed in each pixel region (not shown). A positive voltage or a negative voltage is selectively applied to each of the pixel electrodes 28. When the capsules 63 including the white-dyed particles 59 and the black-dyed particles 61 have various sizes, a filtering process is performed to select the capsules 63 having a uniform size.

When a positive or negative voltage is applied to the ink layer 57, the white-dyed particles 59 and the black-dyed particles 61 in the capsules 63 move towards opposite polarities according to polarities of the applied voltage. Therefore, when the black-dyed particles 61 move upward, a black color is displayed. Alternatively, when the white-dyed particles 59 move upward, a white color is displayed.

FIG. 2 is a cross-sectional view of schematically illustrating an electrophoretic display device according to the related art. In FIG. 2, the related art electrophoretic display device 1 includes a first substrate 11, a second substrate 36 and an ink layer 57 interposed therebetween. The ink layer 57 includes fifth and sixth adhesive layers 51 and 53, a common electrode 55 and capsules 63. The common electrode 55 and the capsules 63 are disposed between the fifth and sixth adhesive layers 51 and 53. The fifth and sixth adhesive layers 51 and 53 face each other and include a transparent material. The common electrode 55 is formed of a transparent conductive material. Each capsule 63 has a plurality of white-dyed particles 59 and a plurality black-dyed particles 61 therein. The white- and black-dyed particles 59 and 61 are negatively and positively charged by a condensation polymerization reaction, respectively.

The second substrate 36 includes a transparent material such as plastic or glass. The first substrate 11 includes an opaque material such as stainless steel. As occasion demands, the first substrate 11 may be formed of a transparent material such as plastic or glass. A color filter layer 40 is formed on an inner surface of the second substrate 36. The color filter layer 40 includes red, green and blue color filter patterns.

Gate lines (not shown) and data lines (not shown) are formed on the first substrate 11 in a matrix shape. The gate lines and the data lines cross each other to define pixel regions P. A thin film transistor Tr is formed at each crossing portion of the gate lines and the data lines in each pixel region P. The thin film transistor Tr includes a gate electrode 14, a gate insulating layer 16, a semiconductor layer 18, a source electrode 20 and a drain electrode 22. The gate electrode 14 extends from the gate line (not shown). The gate insulating layer 16 covers the gate electrode 14. The semiconductor layer 18 overlaps the gate electrode 14 and includes an active layer 18a and ohmic contact layers 18b. The source electrode 20 contacts the semiconductor layer 18 and extends from the data line (not shown). The drain electrode 22 is spaced apart from the source electrode 20.

A passivation layer 26 is formed on a substantially entire surface of the first substrate 11 including the thin film transistor Tr. The passivation layer 26 includes a drain contact hole 27 exposing the drain electrode 22.

A pixel electrode 28 is formed on the passivation layer 26 in each pixel region P. The pixel electrode 28 is connected to the drain electrode 22 through the drain contact hole 27. The pixel electrode 28 is formed of a transparent conductive material, for example, one of indium-tin-oxide (ITO) and indium-zinc-oxide (IZO).

The electrophoretic display device 1 having the above-mentioned structure uses ambient light, for example, natural light or room electric light, as a light source. The electrophoretic display device 1 displays images by inducing a position change of the white-dyed particles 59 and the black-dyed particles 61 in the capsules 63 depending on a polarity of a voltage selectively applied to the pixel electrode 28.

Hereinafter, a method of manufacturing the related art electrophoretic display device will be described with reference to accompanying drawings.

FIGS. 3A to 3E are cross-sectional views of illustrating an electrophoretic display device in steps of a fabricating process for the same according to the related art. For convenience of explanation, defined are a display area including a plurality of pixel regions P and a non-display area at a periphery of the display area.

In FIG. 3A, first and second adhesive layers 7 and 9 are formed on upper and lower surfaces of a first carrier substrate 5, for example, a glass substrate, respectively. First and second metal thin film substrates 11 and 13 of a stainless steel are attached to outer surfaces of the first and second adhesive layers 7 and 9, respectively.

Next, an insulating layer (not shown) is formed on substantially an entire surface of the first metal thin film substrate 11. Gate lines (not shown) and data lines (not shown) crossing each other to define pixel regions P are formed on the insulating layer. A thin film transistor Tr connected to the gate and data lines is formed in each pixel region P. Although not shown in the figure, a gate pad electrode connected to the gate line and a data pad electrode connected to the data line are formed in the non-display area at the periphery of the display area.

A passivation layer 26 is formed entirely over the thin film transistor Tr by applying an organic insulating material. The passivation layer 26 is patterned to thereby form a drain contact hole 27 exposing a drain electrode (not shown) of the thin film transistor Tr in the pixel region P, a gate pad contact hole (not shown) exposing the gate pad electrode, and a data pad contact hole (not shown) exposing the data pad electrode.

A transparent conductive material layer is formed and patterned to thereby form a pixel electrode 28 contacting the drain electrode of the thin film transistor Tr through the drain contact hole 27 in the pixel region P, a gate auxiliary pad electrode (not shown) contacting the gate pad electrode through the gate pad contact hole in the non-display area, and a data auxiliary pad electrode (not shown) contacting the data pad electrode through the data pad contact hole in the non-display area. Accordingly, an array substrate 22 for the electrophoretic display device including the above-mentioned elements may be completed.

Next, in FIG. 3B, third and fourth adhesive layers 32 and 34 are formed on upper and lower surfaces of a second carrier substrate 30, for example, a glass substrate, respectively. First and second transparent substrates 36 and 38 are attached to outer surfaces of the third and fourth adhesive layers 32 and 34, respectively. The first and second transparent substrates 36 and 38 may be flexible plastic.

A color filter layer 40 including red (R), green (G) and blue (B) color filter patterns 40a, 40b and 40c sequentially arranged is formed on the first transparent substrate 36. Each of the red (R), green (G) and blue (B) color filter patterns 40a, 40b and 40c corresponds to the pixel region P in the array substrate 22. Accordingly, a color filter substrate 42 for the electrophoretic display device including the above-mentioned elements may be completed. Here, a black matrix (not shown) may be further formed. The black matrix overlaps edges of the color filter patterns 40a, 40b and 40c and surrounds each pixel region P.

In FIG. 3C, an electrophoresis film 65 is attached to the array substrate 22. The electrophoresis film 65 includes fifth and sixth adhesive layers 51 and 53, a common electrode 55 and an ink layer 57. The ink layer 57 is disposed between the fifth and sixth adhesive layers 51 and 53. The common electrode 55 is formed of a transparent conductive material and is disposed between the sixth adhesive layer 53 and the ink layer 57. The ink layer 57 includes a plurality of capsules 63, and each capsule 63 has a plurality of white-dyed particles 59 and a plurality black-dyed particles 61 therein. The white-dyed and black-dyed particles 59 and 61 are negatively and positively charged by a condensation polymerization reaction, respectively. The fifth adhesive layer 51 faces the pixel electrode 28 such that the ink layer 57 is positioned between the common electrode 55 and the pixel electrode 28.

In FIG. 3D, the color filter substrate 42 is disposed such that the color filter layer 40 faces the electrophoresis film 65 and then attached to electrophoresis film 65 bonded to the array substrate 22 to thereby form a panel.

In FIG. 3E, the first carrier substrate 5, the first and second adhesive layers 7 and 9, and the second metal thin film substrate 13 are detached from the first metal thin film substrate 11 of the array substrate 22 of FIG. 3D. Subsequently, the second carrier substrate 30, the third and fourth adhesive layers 32 and 34, and the second transparent substrate 38 are detached from the first transparent substrate 36 of the color filter substrate 65 of FIG. 3D. Accordingly, the electrophoretic display device 1 can be obtained.

However, there are disadvantages in the above-mentioned fabricating process for the related art electrophoretic display device. The array substrate requires steps of attaching the first and second adhesive layers on the upper and lower surfaces of the first carrier substrate, attaching the first and second metal thin film substrates on the first and second adhesive layers, and forming the array elements, for example, the thin film transistor or the pixel electrode, on the first metal thin film substrate attached on the first adhesive layer. Moreover, the color filter substrate requires steps of attaching the third and fourth adhesive layers on the second carrier substrate, attaching the first and second transparent substrates on the third and fourth adhesive layers, and forming the color filter layer on the first transparent substrate. In addition, unessential elements, for example, the first and second carrier substrates, are detached from the panel. Accordingly, the fabricating process is very complicated.

Furthermore, when the unessential elements, which are required in the fabricating process for the electrophoretic display device but are not required in the completed electrophoretic display device, are detached, there may be stresses, and misalignment may be caused between the array substrate and the color filter substrate. Accordingly, this causes degradation of image qualities.

In addition, there may be scratch damages on the first transparent substrate, which is formed of a relatively low hardness material such as plastic, during attaching and detaching steps.

SUMMARY OF THE INVENTION

Accordingly, the present invention is directed to an electrophoretic display device and method of fabricating the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electrophoretic display device includes a switching element on a substrate including a display area having a pixel region and a non-display area at a periphery of the display area, a passivation layer covering the switching element, a pixel electrode on the passivation layer and connected to the switching element, an electrophoresis film on the pixel electrode and including an ink layer and a base film, wherein the ink layer includes a plurality of charged particles, a common electrode for generating an electric field with the pixel electrode to drive the electrophoresis film, and a color filter layer directly on the electrophoresis film, wherein the color filter layer is formed under temperatures of less than 100 degrees of Celsius.

In another aspect, a method of fabricating an electrophoretic display device includes forming a switching element on a substrate including a display area having a pixel region and a non-display area at a periphery of the display area, forming a passivation layer covering the switching element, forming a pixel electrode on the passivation layer and connected to the switching element, attaching an electrophoresis film onto the pixel electrode, the electrophoresis film including an ink layer, a common electrode and a base film, wherein the ink layer includes a plurality of charged particles, the common electrode generates an electric field with the pixel electrode, and forming a color filter layer directly on the electrophoresis film under temperatures of less than 100 degrees of Celsius.

In another aspect, an electrophoretic display device includes a substrate including a display area and a non-display area at a periphery of the display area, a gate line and a data line on the substrate and crossing each other, a thin film transistor including a gate electrode, a gate insulating layer, a semiconductor layer, a source electrode and a drain electrode, wherein the gate electrode is connected to the gate line, the gate insulating layer covers the gate electrode, the semiconductor layer is disposed on the gate insulating layer, the source electrode is disposed on the semiconductor layer and connected to the data line, and the drain electrode is disposed on the semiconductor layer and spaced apart from the source electrode, a passivation layer covering an entire surface of the substrate including the thin film transistor and having a drain contact hole exposing the drain electrode, wherein the passivation layer includes a triple-layered structure having a first inorganic insulating material layer, an organic insulating material layer and a second inorganic insulating material layer in the display area, and the passivation layer includes a single-layered structure having the first inorganic insulating material layer in the non-display area, a pixel electrode on the passivation layer and connected to the drain electrode through the drain contact hole, the pixel electrode entirely covering the thin film transistor, an electrophoresis film on the pixel electrode and including an adhesive layer, an ink layer on the adhesive layer, a common electrode on the ink layer, and a base film on the common electrode, wherein the ink layer includes a plurality of charged particles, a color filter layer directly on the electrophoresis film, and a protection sheet on the color filter layer, wherein the color filter layer is formed under temperatures of less than 100 degrees of Celsius.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 11A to 11C are cross-sectional views schematically showing an electrophoretic display device in steps of a fabricating process according to another embodiment of the present invention;

DETAILED DESCRIPTION OF THE ILLUSTRATED EMBODIMENTS

Reference will now be made in detail to the illustrated embodiments of the present invention, which are illustrated in the accompanying drawings.

In an electrophoretic display device according to the present invention, both a film-type ink layer and a color filter layer are formed on an array substrate including thin film transistors.

FIGS. 4A to 4H, FIGS. 5A to 5H, and FIGS. 6A to 6H are cross-sectional views of illustrating an electrophoretic display device in steps of a fabricating process according to a first embodiment of the present invention. FIGS. 7A to 7C are plan views of illustrating an electrophoretic display device in steps of a fabricating process according to the first embodiment of the present invention. FIGS. 4A to 4H show a pixel region, where a thin film transistor and a storage capacitor are formed, of an electrophoretic display device. FIGS. 5A to 5H show a gate pad region of an electrophoretic display device. FIGS. 6A to 6H show a data pad region of an electrophoretic display device. FIGS. 7A to 7C show a display area, a non-display area, and an align mark for a color filter layer.

Here, a display area DA and a non-display area NA at a periphery of the display area DA are defined. The display area DA includes a plurality of pixel regions P, each of which includes a switching region TrA for a thin film transistor and a storage region StgA for a storage capacitor. The non-display area NA includes a gate pad region GPA for gate pad electrodes and a data pad region DPA for data pad electrodes.

Figure 1:
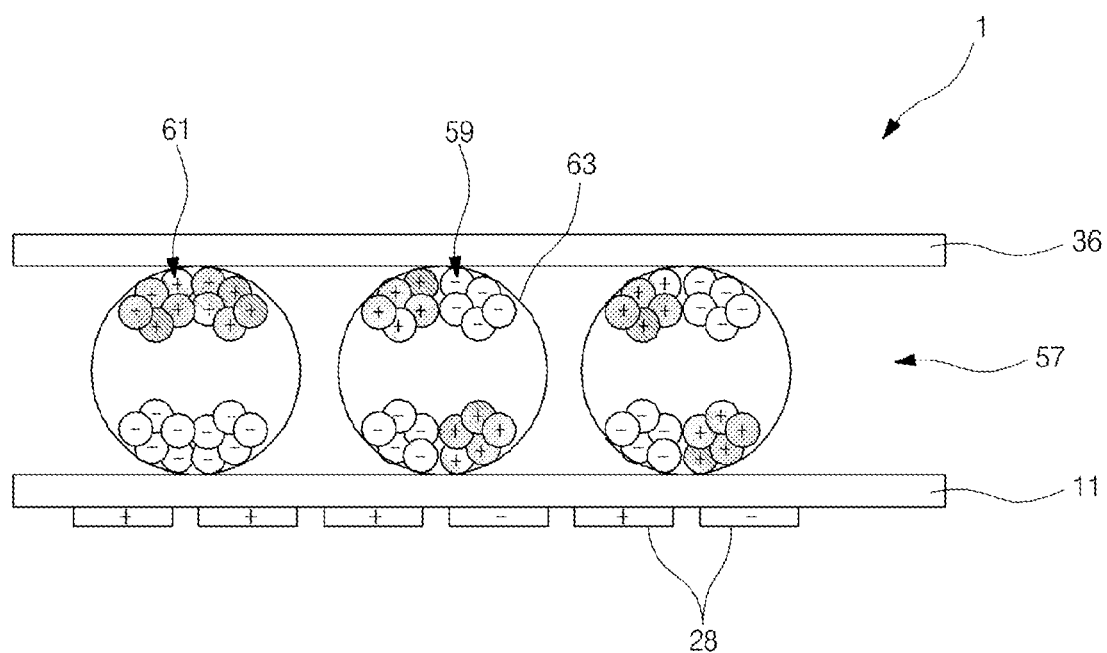
FIG. 1 is a schematic view of a related art electrophoretic display device to explain a driving principle of the same.
Figure 2:
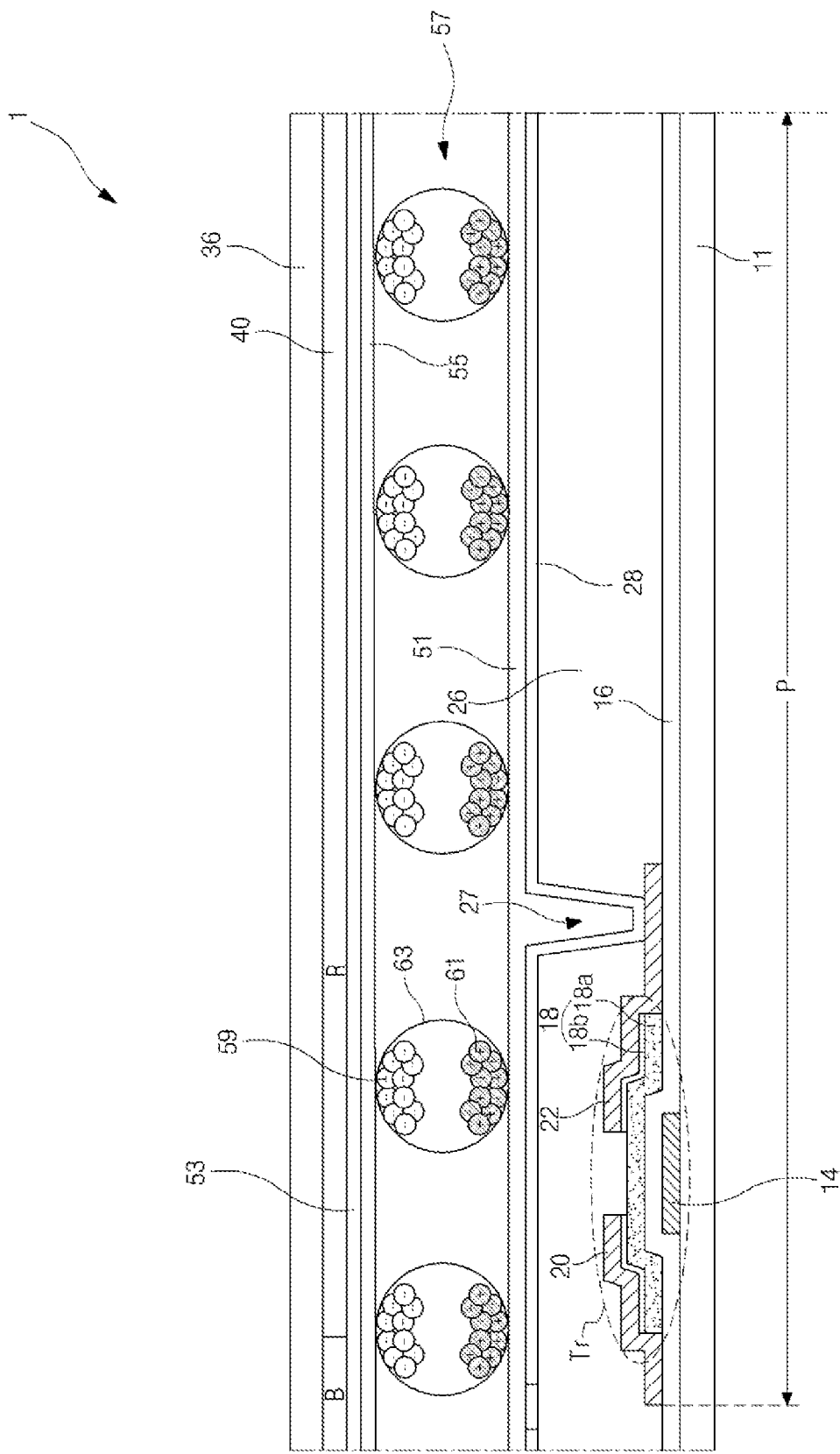
FIG. 2 is a cross-sectional view of schematically illustrating an electrophoretic display device according to the related art.
Figure 3A:
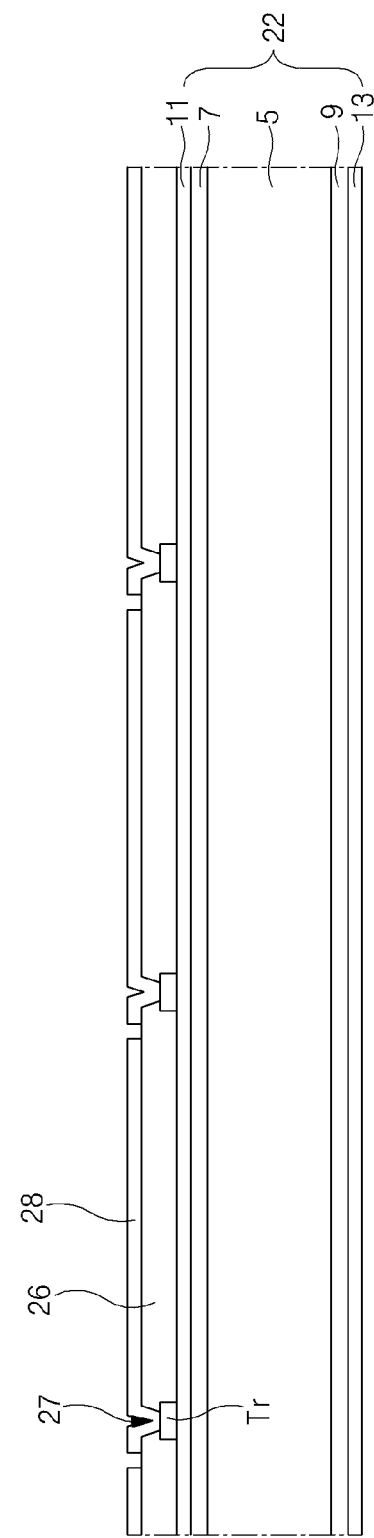
FIGS. 3A to 3E are cross-sectional views of illustrating an electrophoretic display device in steps of a fabricating process for the same according to the related art.
Figure 3B:
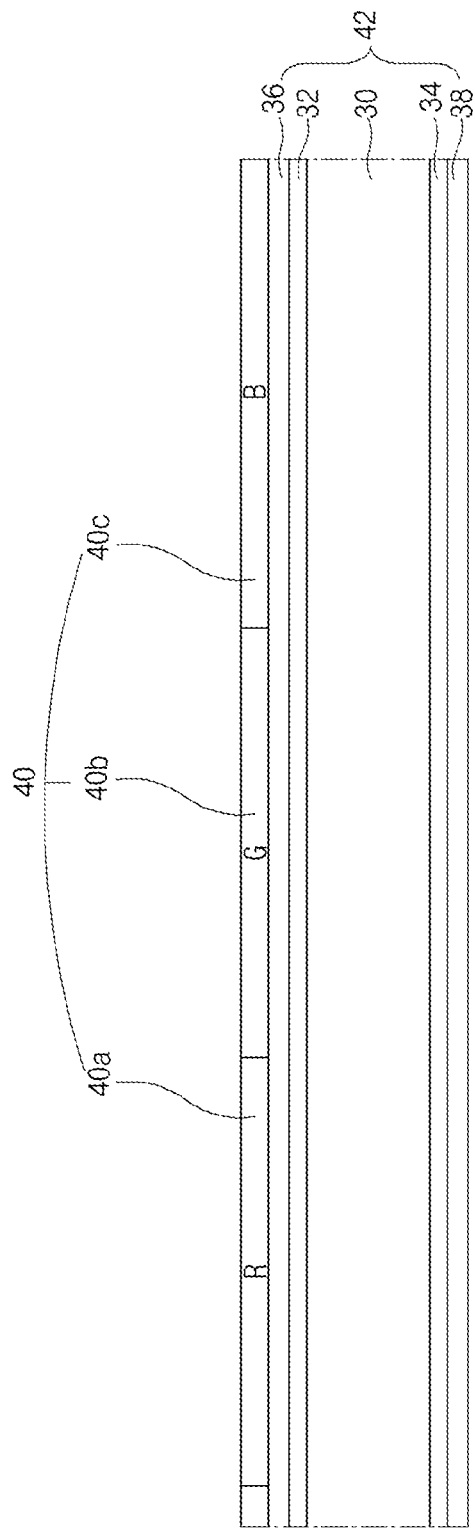
Figure 3C:
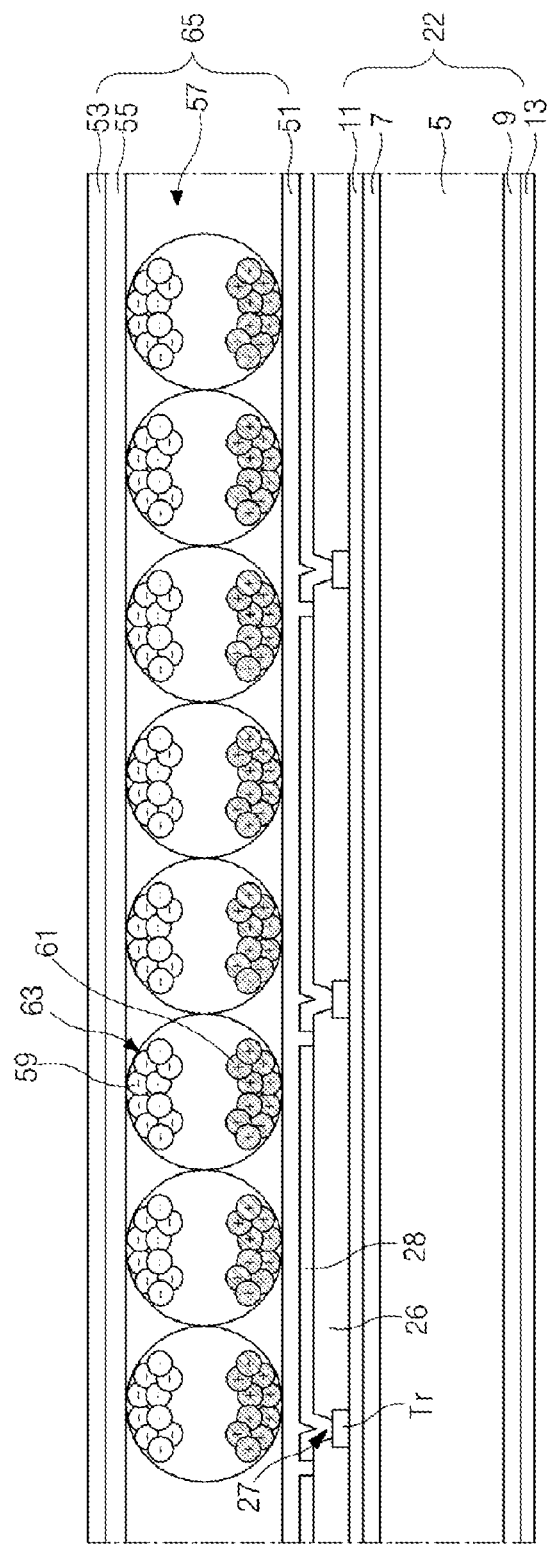
Figure 3D:
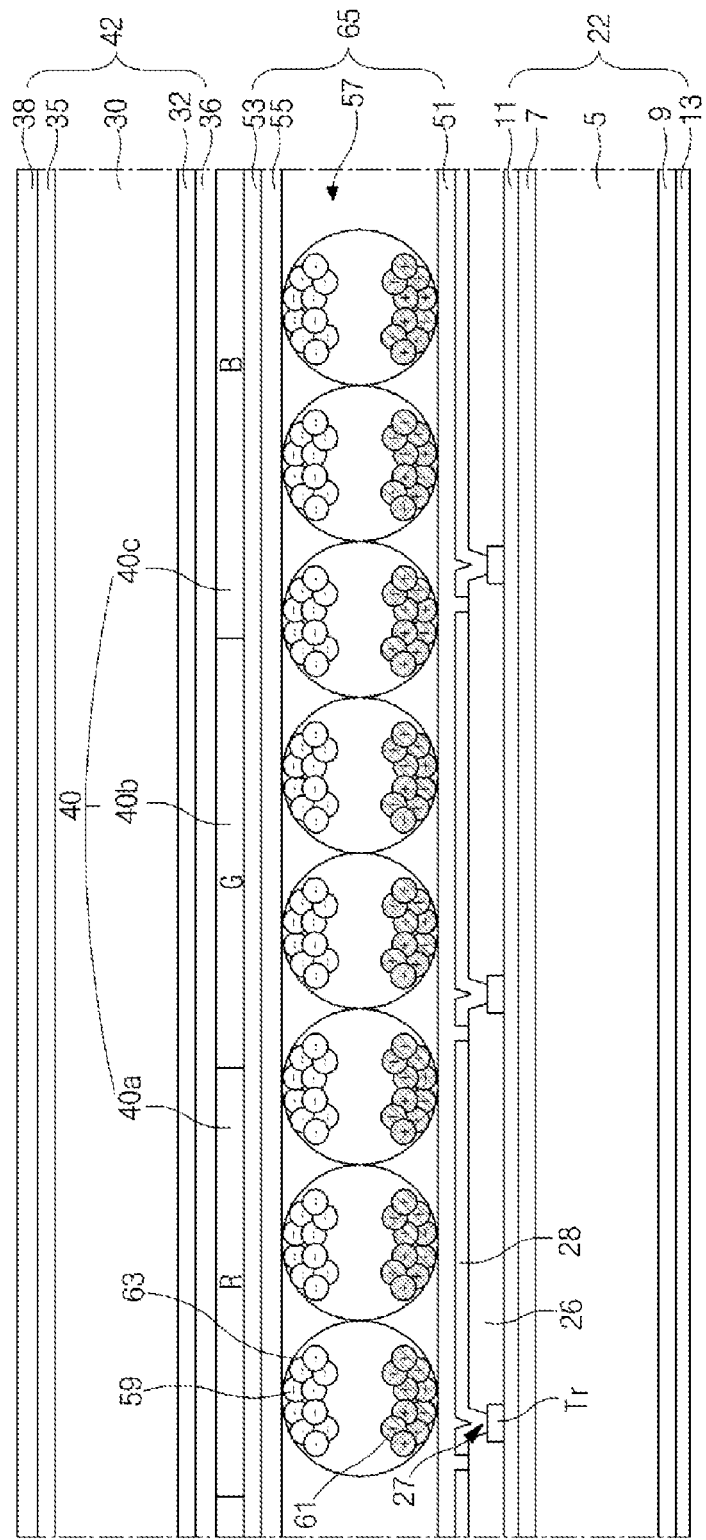
Figure 3E:
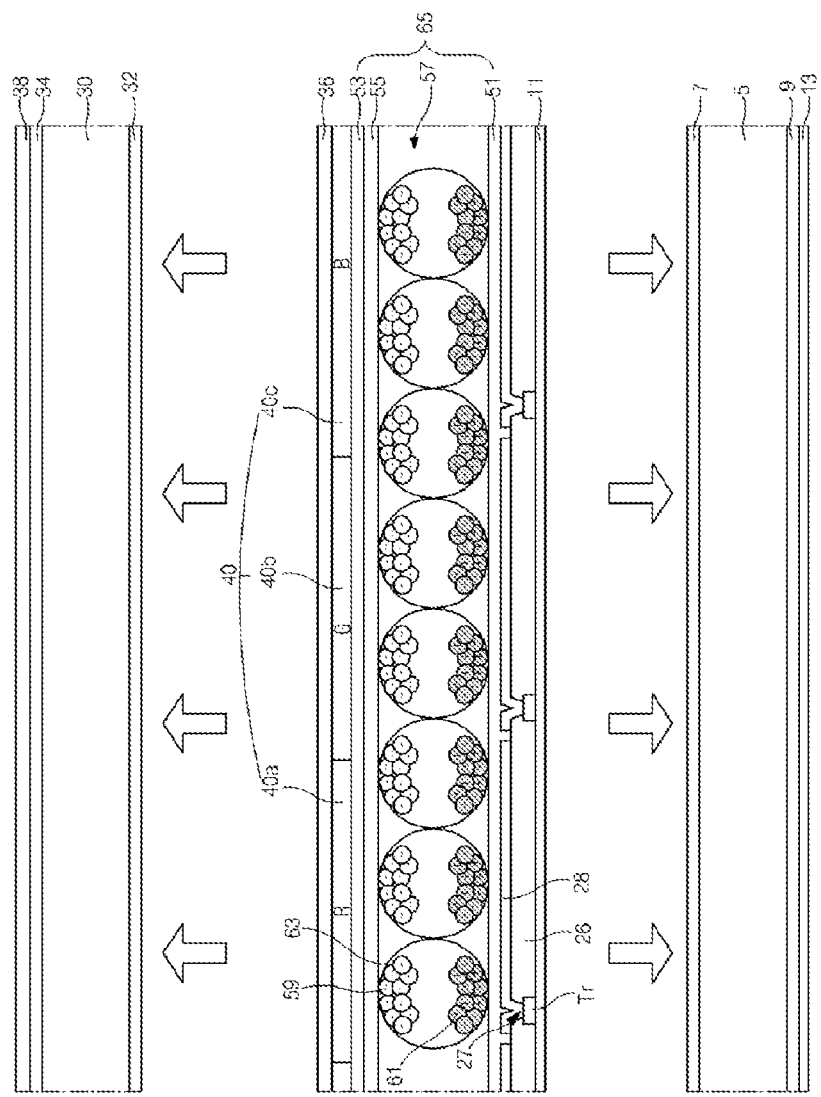
Figure 4A:
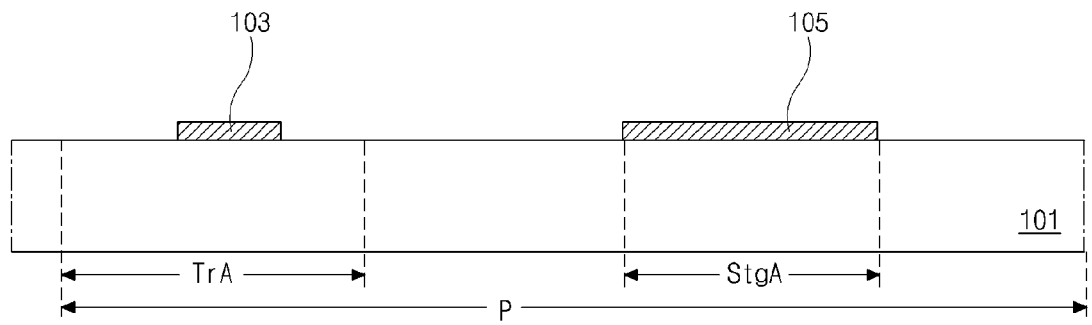
FIGS. 4A to 4H are cross-sectional views of illustrating an electrophoretic display device in steps of a fabricating process according to a first embodiment of the present invention.
Figure 5A:
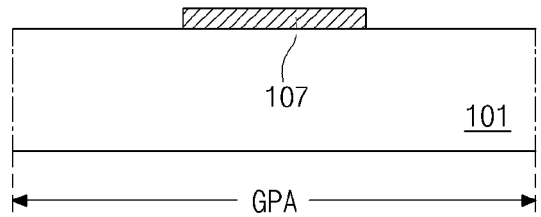
FIGS. 5A to 5H are cross-sectional views of illustrating an electrophoretic display device in steps of a fabricating process according to the first embodiment of the present invention.
Figure 6A:
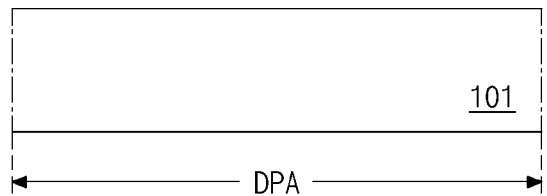
FIGS. 6A to 6H are cross-sectional views of illustrating an electrophoretic display device in steps of a fabricating process according to the first embodiment of the present invention.
Figure 7A:
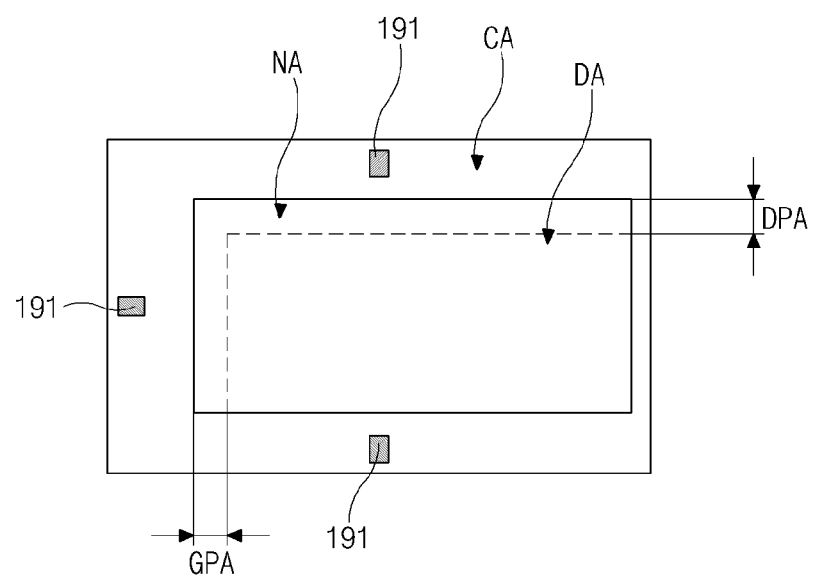
FIGS. 7A to 7C are plan views of illustrating an electrophoretic display device in steps of a fabricating process according to the first embodiment of the present invention.
Figure 7B:
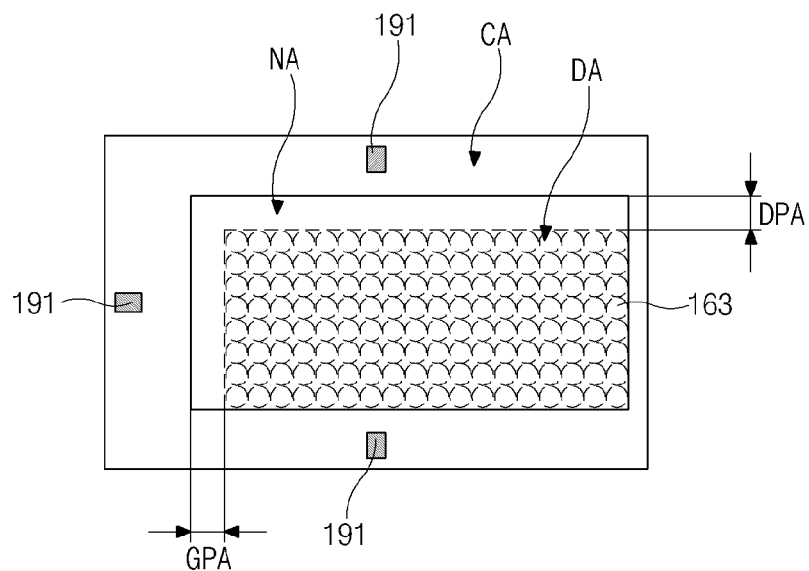
Figure 7C:
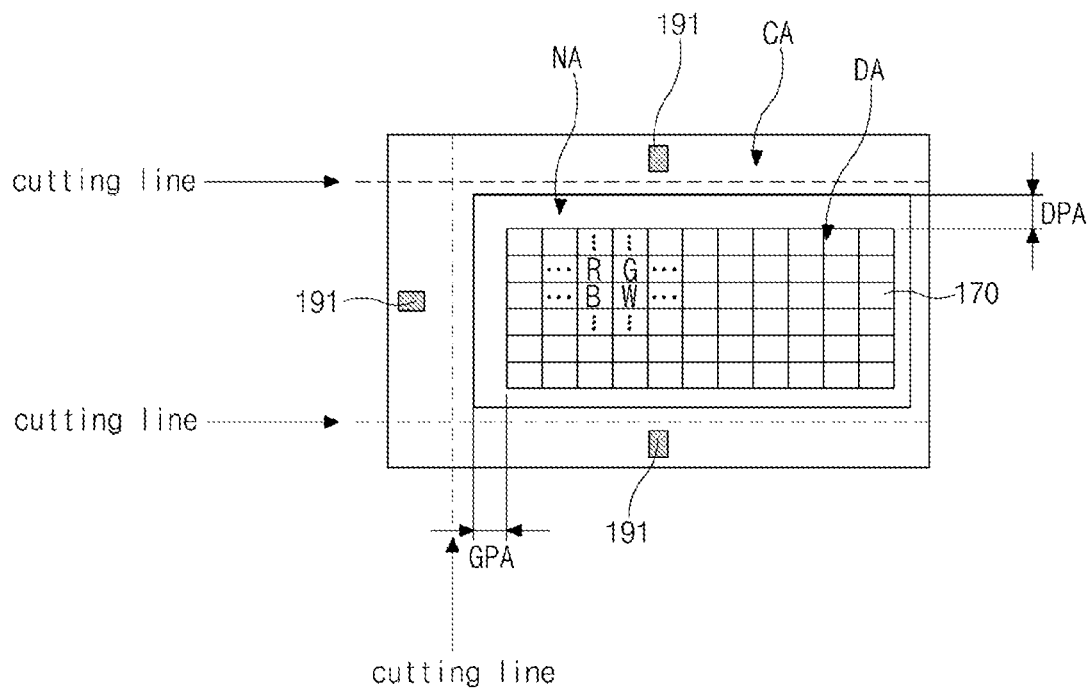

In FIGS. 4A, 5A and 6A, a first metallic material is deposited on an insulating substrate 101, for example, a glass substrate or a plastic substrate, to thereby form a first metal layer (not shown). The first metallic material may be aluminum (Al), aluminum alloy (AlNd), copper (Cu), copper alloy, chrome (Cr), or titanium (Ti) alloy. The first metallic material layer is patterned by a mask process to thereby form a gate line (not shown), a gate electrode 103 in the switching region TrA, a first storage electrode 105 in the storage region StgA, and a gate pad electrode 107 in the gate pad region GPA. The mask process includes steps of forming a photoresist (PR) layer, exposing the photoresist layer to light using a mask, developing the exposed photoresist layer to form a photoresist pattern, etching the first metallic material layer to form a desired metal pattern, and striping the photoresist pattern. The gate line extends along a direction, and the gate electrode 103 is connected to the gate line. The first storage electrode 105 may be a portion of the gate line. Alternatively, when a common line (not shown) is formed to be parallel to the gate line, the first storage electrode 105 may be a portion of the common line. The gate pad electrode 107 is connected to an end of the gate line. Here, the gate line, the gate electrode 103, the first storage electrode 105 and the gate pad electrode 107 have a single-layered structure.

Each of the gate line, the gate electrode 103, the first storage electrode 105 and the gate pad electrode 107 may have a double-layered structure. The double-layered structure may be aluminum alloy (AlNd)/molybdenum (Mo) or titanium alloy/copper (Cu). When the first metal layer of the double-layered structure includes a lower layer of molybdenum (Mo) and an upper layer of aluminum alloy (AlNd) and a color filter layer is formed on an electrophoresis film by a mask process later, in a developer for patterning the color filter layer, KOH, beneficially, may have a concentration of less than 0.1 wt %. Here, to compensate for demerits of molybdenum (Mo), the aluminum alloy (AlNd) is formed as the upper layer. By the way, the gate pad electrode 107 may be exposed after the mask process for the color filter, and the upper layer of the gate pad electrode 107, i.e., the aluminum alloy (AlNd), may react with and may melt in the KOH solution. Even though a gate auxiliary pad electrode of ITO may be formed in the same process as a pixel electrode and may cover the gate pad electrode 107, the developer may permeate via grains of the ITO and may damage the upper layer of the aluminum alloy (AlNd).

On the other hand, when the first metal layer of the double-layered structure includes titanium alloy/copper (Cu), the titanium alloy does not react with the developer, and there is no problem as mentioned above.

Referring to FIG. 7A, an align mark 191 is formed in an align mark region CA, which will be removed by a cutting process, by a patterning process for the first metal layer. The align mark 191 is used for exactly aligning a color filter layer with the pixel region P. The non-display area, where the gate pad electrode 107 of FIG. 5A and a data pad (not shown) are formed, is positioned between the display area DA, where the pixel region P is disposed, and the align mark region CA. The align mark 191 is formed in each of a first cut region adjacent to the gate pad region GPA, a second cut region adjacent to the data pad region DPA, and a third cut region facing the first cut region. The align mark 191 is positioned in an outer region of a cutting line. Since the color filter layer includes red, green and blue color filter patterns, each of the first to third regions of the align mark region CA include at least one align mark 191. The align mark 191 may be formed in another process to be performed later.

Figure 4B:
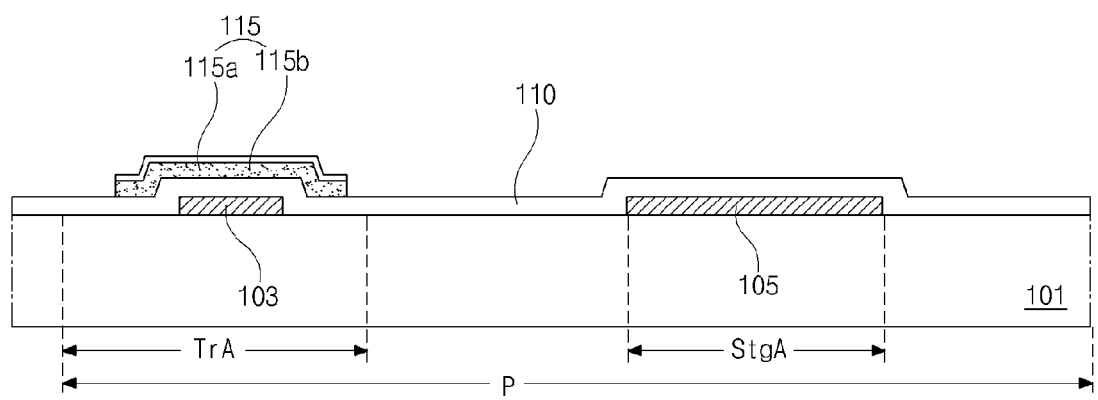
Figure 5B:
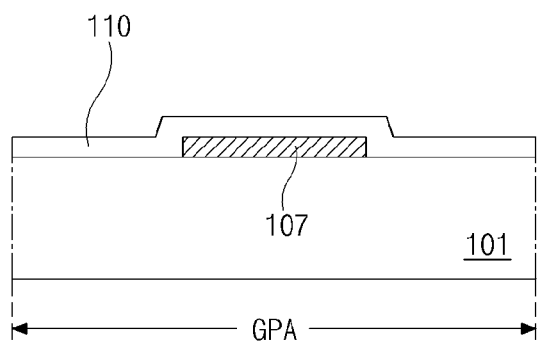
Figure 6B:
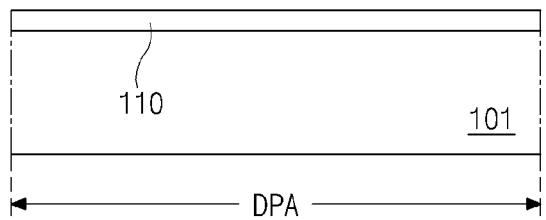

In FIGS. 4B, 5B and 6B, a gate insulating layer 110 is formed on substantially an entire surface of the substrate 101 including the gate line, the gate electrode 103, the first storage electrode 105 and the gate pad electrode 107 by depositing an inorganic insulating material such as silicon oxide ($SiO_2$) and silicon nitride (SiNx). Next, an intrinsic amorphous silicon layer (not shown) of intrinsic amorphous silicon and an impurity-doped amorphous silicon layer (not shown) of impurity-doped amorphous silicon are sequentially formed on the gate insulating layer 110. The intrinsic amorphous silicon layer and the impurity-doped amorphous silicon layer are patterned by a mask process to thereby form an active layer 115a of intrinsic amorphous silicon and an impurity-doped amorphous silicon pattern 115b of impurity-doped amorphous silicon. The active layer 115a and the impurity-doped amorphous silicon pattern 115b correspond to the gate electrode 103 in the switching region TrA.

Figure 4C:
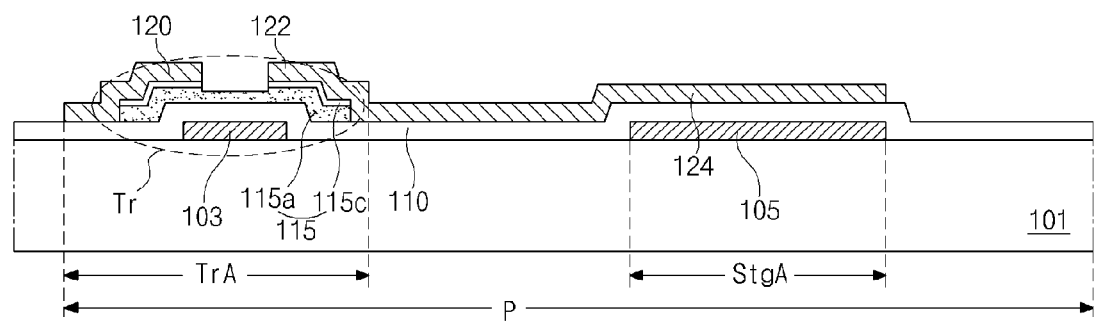
Figure 5C:
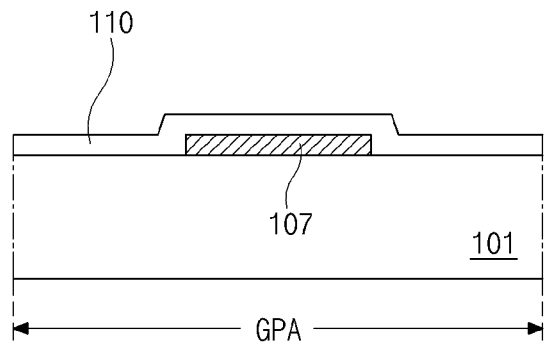
Figure 6C:
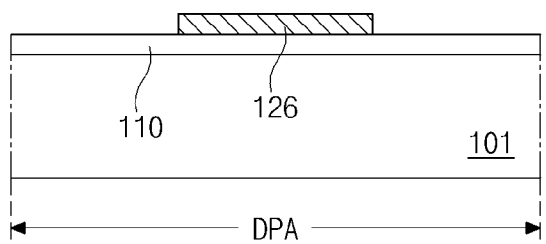

In FIGS. 4C, 5C and 6C, a second metallic material is deposited on the active layer 115a, the impurity-doped amorphous silicon pattern 115a of FIG. 4B and the gate insulating layer 110 to thereby form a second metal layer (not shown). The second metallic material includes one of molybdenum (Mo), copper (Cu), titanium (Ti) alloy and aluminum alloy (AlNd). The second metal layer may be a double-layered or triple-layered structure. For example, the second metal layer may have a double-layered structure of titanium alloy/copper, and the second metal layer may have a triple-layered structure of molybdenum (Mo)/aluminum alloy (AlNd)/molybdenum (Mo). Here, FIGS. 4C, 5C and 6C show the second metal layer having a single-layered structure.

The second metal layer (not shown) is patterned to thereby form a data line (not shown), a source electrode 120 in the switching region TrA, a drain electrode 122 in the switching region TrA, a second storage electrode 124 in the storage region StgA, and a data pad electrode 126 in the data pad region DPA. The data line crosses the gate line to define the pixel region P. The source and drain electrodes 120 and 122 are disposed on the impurity-doped amorphous silicon pattern 115b in the switching region TrA and spaced apart from each other. The source electrode 120 is connected to the data line, and the second storage electrode 124 is connected to the drain electrode 122. The data pad electrode 126 is disposed on the gate insulating layer 110 and connected to an end of the data line.

As stated above, when the data pad electrode is a single-layered structure of aluminum alloy (AlNd) or is a double- or triple-layered structure including aluminum alloy (AlNd) as an upper layer, to prevent damage of the aluminum alloy (AlNd) layer, the developer for patterning the color filter layer may include KOH of less than about 0.1 wt %. On the other hand, when the data pad electrode is a single-layered structure of molybdenum (Mo), a double-layered structure of titanium alloy/copper (Cu), or a triple-layered structure of molybdenum (Mo)/aluminum alloy (AlNd)/molybdenum (Mo), a conventional developer can be used for patterning the color filter layer.

Then, an exposed portion of the impurity-doped amorphous silicon pattern 115a between the source and drain electrodes 120 and 122 is removed by a dry-etching process, and a portion of the active layer 115a is exposed between the source and drain electrodes 120 and 122. An ohmic contact layer 115c is formed under the source and drain electrodes 120 and 122. The active layer 115a and the ohmic contact layer 115c constitute a semiconductor layer 115. The gate electrode 103, the gate insulating layer 110, the semiconductor layer 115 including the active layer 115a and the ohmic contact layer 115c, the source electrode 120, and the drain electrode 122 constitute a thin film transistor Tr. The thin film transistor Tr is a switching element and is switched by the gate line to thereby supply data to the pixel electrode.

On the other hand, if the align mark 191 of FIG. 7A is not formed in a process of forming the gate line and the gate electrode 103, the align mark 191 may be formed on the gate insulating layer 110 in the first to third regions of the align mark region CA when the data line, the source electrode 120 and the drain electrode 122 are formed.

Even though the semiconductor layer 115 and the source and drain electrodes 120 and 122 are formed by different mask processes from each other, the semiconductor layer 115 and the source and drain electrodes 120 and 122 may be formed by a single mask process. More particularly, although not shown in the figures, the intrinsic amorphous silicon layer, the impurity-doped amorphous silicon layer and the second metal layer may be sequentially formed on the gate insulating layer 110. Then, the intrinsic amorphous silicon layer, the impurity-doped amorphous silicon layer and the second metal layer are patterned by a single mask process using a diffraction exposing method or a half-tone exposing method to thereby form photoresist patterns having different thicknesses. The intrinsic amorphous silicon layer, the impurity-doped amorphous silicon layer and the second metal layer are etched by using the photoresist patterns as an etching mask. In this case, semiconductor patterns, each of which includes the same material as the semiconductor layer, are formed under the data line and the data pad electrode. Moreover, when the align mark is formed in this process, a semiconductor pattern is also formed under the align mark.

Figure 4D:
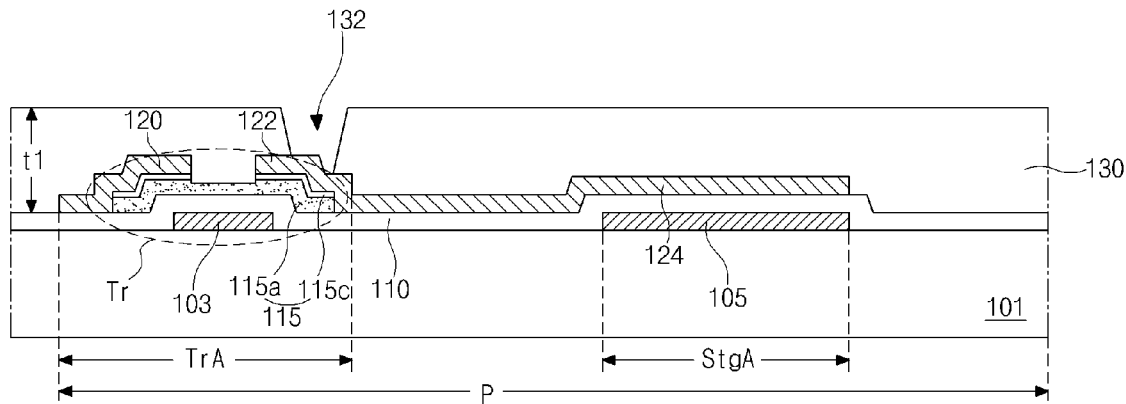
Figure 5D:
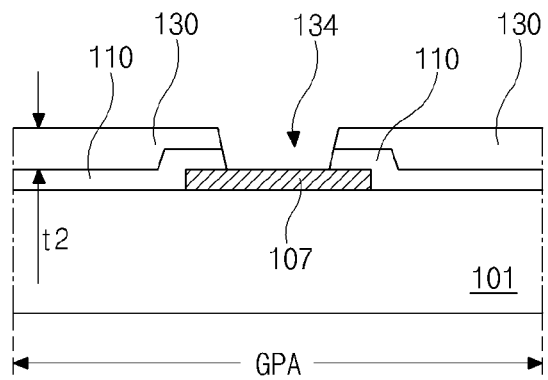
Figure 6D:
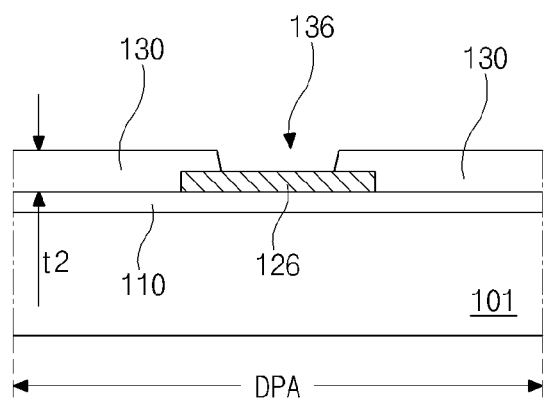

In FIG. 4D, 5D and 6D, a passivation layer 130 is formed on the data line, the source and drain electrodes 120 and 122, the second storage electrode 124 and the data pad electrode 126 by applying an organic insulating material such as photo-acryl and benzocyclobutene (BCB). The passivation layer 130 has a flat top surface. The passivation layer 130 may be patterned by a mask process including a diffraction exposing method or a half-tone exposing method to thereby form a drain contact hole 132, a gate pad contact hole 134 and a data pad contact hole 136. Here, a scan-type exposing apparatus may be used. The drain contact hole 132, the gate pad contact hole 134 and the data pad contact hole 136 expose the drain electrode 122, the gate pad electrode 107 and the data pad electrode 126, respectively. In addition, the passivation layer 130 in the pixel region P has a first thickness t1, while the passivation layer 130 in the non-display area NA of FIG. 7A including the gate pad region GPA and the data pad region DPA has a second thickness t2 smaller than the first thickness t1. Alternatively, the passivation layer 130 may be exposed to light by two light-exposing steps including a blank shot using a stepper-type exposing apparatus and then may be developed. The passivation layer 130 is formed of an organic insulating material to minimize a parasitic capacitance and obtain a flat top surface. For example, the parasitic capacitance may be generated between the first storage electrode 105 and the pixel electrode and between the second storage electrode 124 and the pixel electrode. Particularly, the pixel electrode on the passivation layer 130 may completely cover the thin film transistor. In this case, the parasitic capacitance can be generated between the thin film transistor and the pixel electrode, and this lowers image qualities. Accordingly, to minimize the parasitic capacitance, the passivation layer 130 is formed of an organic insulating material. Specially, the passivation layer 130 may have a thickness of more than 2.5 micrometers, for example, 2.5 to 5 micrometers. In a conventional LCD device, the passivation layer may have a thickness of about 1 micrometer because the pixel electrode does not cover the thin film transistor.

As mentioned above, the passivation layer 130 in the display area DA has a different thickness from the passivation layer 130 in the non-display area NA. The first thickness t1 of the passivation layer 130 in the display area DA is greater than the second thickness t2 of the passivation layer 130 in the non-display area Na, that is, t1>t2. On the other hand, a gate auxiliary pad electrode (not shown) and a data auxiliary data electrode (not shown) will be formed on the passivation layer 130 and contact the gate and data pad electrodes 107 and 126 through the gate and data pad contact holes 134 and 136, respectively. To connect the gate auxiliary pad electrode and the data auxiliary pad electrode with an external driving circuit substrate (not shown), a tape automated bonding (TAB) process is performed. At this time, each of the gate auxiliary pad electrode and the data auxiliary pad electrode contacts a tape carrier package (TCP) film through an anisotropic conductive film (ACF) including conductive balls (not shown). The deeper depth each of the gate auxiliary pad electrode and the data auxiliary pad electrode has, the greater diameter each of the conductive balls in the ACF has. The conductive balls in adjacent gate pad contact holes or adjacent data pad contact holes may contact each other such that there are electrical short-circuit problems. When the passivation layer 130 in the non-display area NA including the gate pad region GPA and the data pad region DPA has a relatively small thickness, the conductive balls in the ACF have a relatively small diameter such that the electrical short-circuit problems can be prevented. Moreover, by increasing the thickness of the passivation layer 130 in the display area DA, a parasitic capacitance, for example, induced between the pixel electrode and the second storage electrode 124 or between the pixel electrode and the source electrode 120 of the thin film transistor Tr, can be minimized. Accordingly, in the present invention, the first thickness t1 of the passivation layer 130 in the display area DA is greater than the second thickness t2 of the passivation layer 130 in the non-display area NA.

Figure 8A:
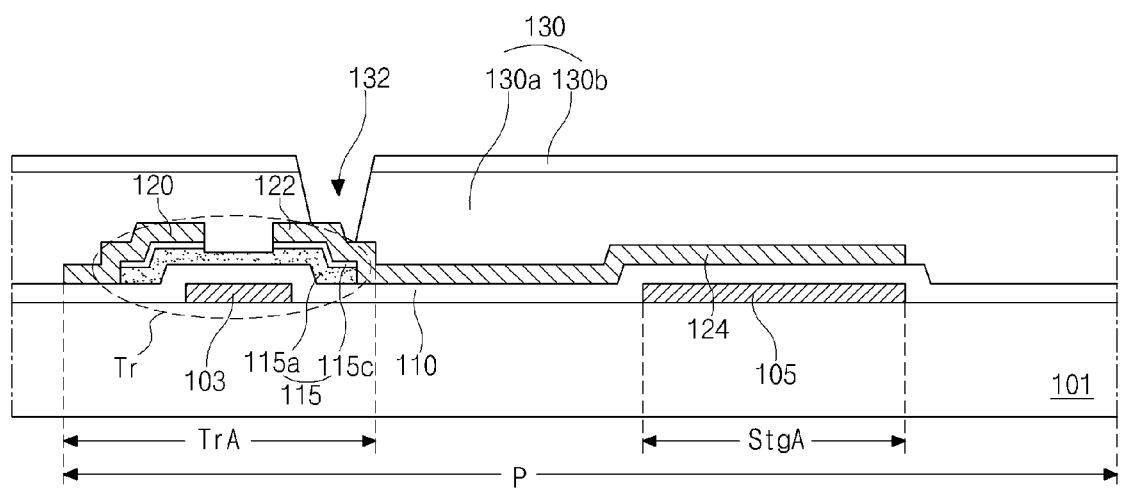
FIGS. 8A to 8C are cross-sectional views respectively showing a passivation layer in a pixel region, a gate pad region and a data pad region in a fabricating process for an electrophoretic display device according to a second embodiment of the present invention.
Figure 8B:
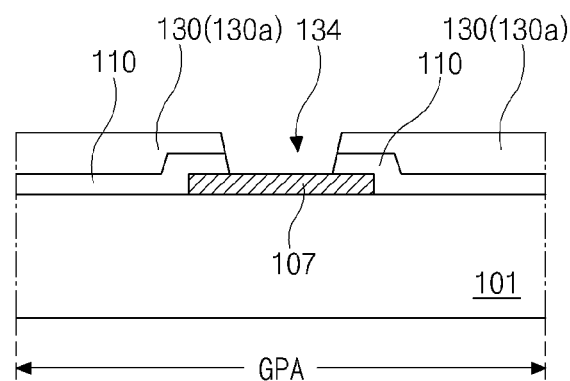
Figure 8C:
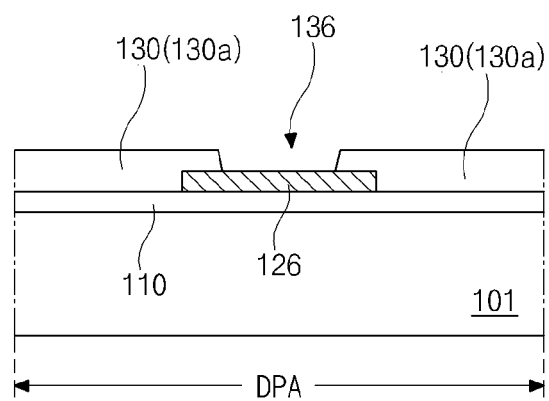
Figure 9A:
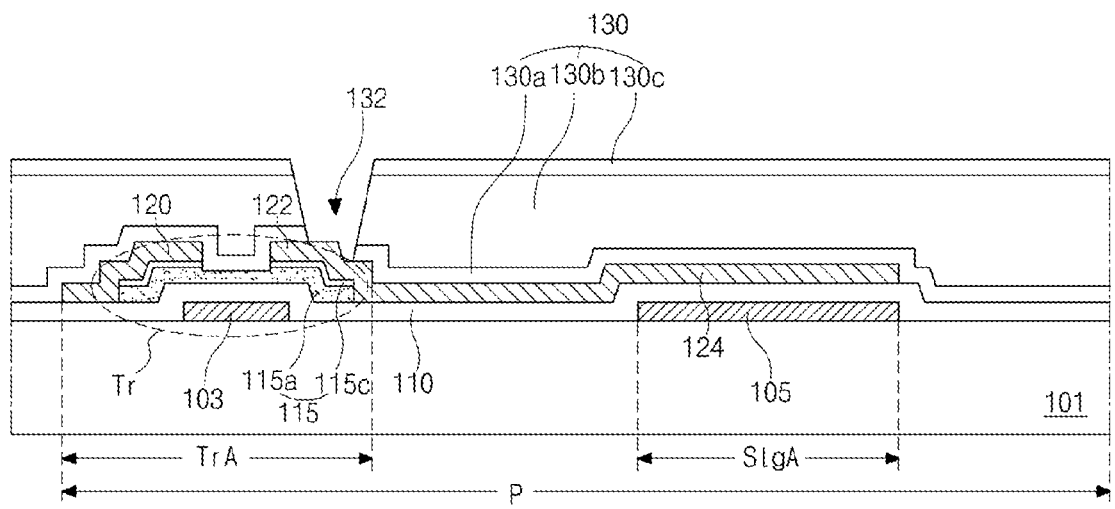
FIGS. 9A to 9C are cross-sectional views respectively showing a passivation layer in a pixel region, a gate pad region and a data pad region in a fabricating process for an electrophoretic display device according to a third embodiment of the present invention.
Figure 9B:
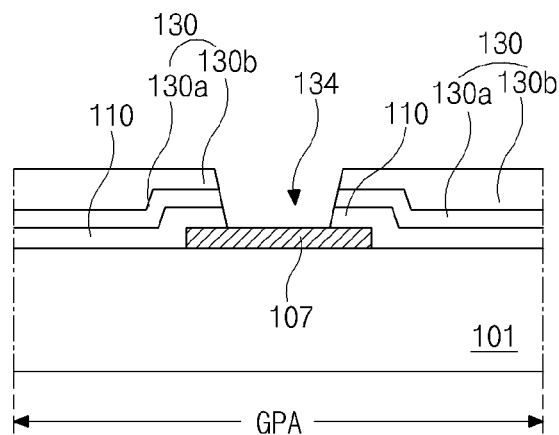
Figure 9C:
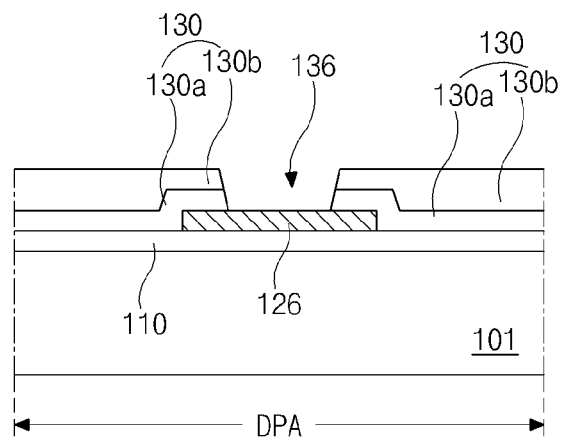

When the passivation layer 130 has a single layered-structure of the organic insulating material such as photo-acryl or BCB, as mentioned above, a light-exposing process in the mask process is directly performed onto the organic insulating material layer because of their photosensitive property. However, the passivation layer 130 may have a double-layered structure or a triple-layered structure, as shown in FIGS. 8A to 8C and 9A to 9C. FIGS. 8A to 8C are cross-sectional views respectively showing a passivation layer in a pixel region, a gate pad region and a data pad region in a fabricating process for an electrophoretic display device according to a second embodiment of the present invention, and FIGS. 9A to 9C are cross-sectional views respectively showing a passivation layer in a pixel region, a gate pad region and a data pad region in a fabricating process for an electrophoretic display device according to a third embodiment of the present invention.

In FIGS. 8A to 8C, when the passivation layer 130 has a double-layered structure, an organic insulating material layer and an inorganic insulating material layer are sequentially stacked. In FIGS. 9A to 9C, when the passivation layer 130 has a triple-layered structure, an inorganic insulating material layer, an organic insulating material layer and an inorganic insulating material layer are sequentially stacked. The organic insulating material layer includes one of photo-acryl and BCB, and the inorganic insulating material layer includes one of silicon oxide and silicon nitride. Here, the organic insulating material layer may have a thickness of more than 2.5 micrometers.

Referring to FIGS. 8A to 8C, the passivation layer 130 includes a lower layer 130a of an organic insulating material and an upper layer of an inorganic insulating material. The contact holes 132, 134 and 136 are formed in the passivation layer 130 by a mask process. In addition, in the non-display area NA including the gate pad region GPA and the data pad region DPA, the upper layer 130b is entirely removed, and the lower layer 130a is partially removed to thereby form the passivation layer 130 having the smaller thickness in the non-display area NA than in the display area DA.

In FIGS. 9A to 9C, when the passivation layer 130 has an upper layer of an inorganic insulating material, light-exposing and developing processes in the mask process can not be directly performed onto the inorganic insulating material layer because the inorganic insulating material does not have a photosensitive property. In this case, a photoresist layer (not shown) of a photoresist material, which has a photosensitive property, may be formed on the inorganic insulating material layer, and the photoresist layer is exposed to light by a diffraction exposing process or a half-tone exposing process and developed to thereby form a first photoresist pattern (not shown) in the display area DA and a second photoresist pattern (not shown) in the non-display area NA, which has a thickness smaller than the first photoresist pattern. Then, the second inorganic insulating material layer 130c of an inorganic insulating material, the organic insulating material layer 130b and the first inorganic insulating material layer 130a of an inorganic insulating material are patterned using the first and second photoresist patterns as an etching mask to expose the gate pad electrode 107 and the data pad electrode 126. Next, the second photoresist pattern in the non-display area NA is removed by an ashing process such that a portion of the second inorganic insulating material layer 130c under the second photoresist pattern is exposed. The exposed portion of the second inorganic insulating material layer 130c is etched such that the passivation layer 130 in the non-display area NA has a double-layered structure of the first inorganic insulating material layer 130a and the organic insulating material layer 130b. Namely, the second inorganic insulating material layer 130c in the non-display area NA is completely removed, and the organic insulating material layer 130b has a reduced thickness.

Figure 13A:
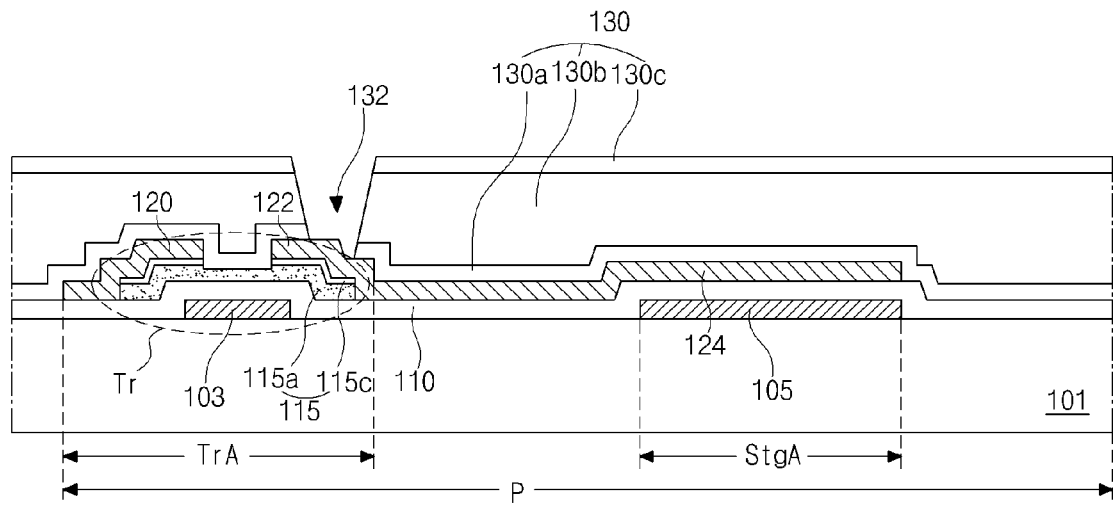
FIGS. 13A to 13C are cross-sectional views for explaining a fabricating process of a passivation layer in a pixel region, a gate pad region and a data pad region of an electrophoretic display device according to another embodiment of the present invention, respectively.
Figure 13B:
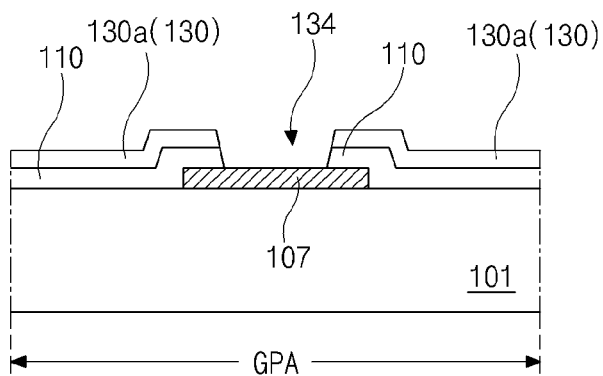
Figure 13C:
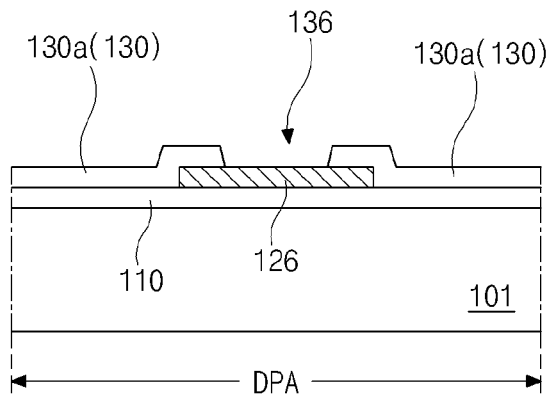

On the other hand, in FIGS. 9B and 9C, although the organic insulating material layer 130b is partially removed, the organic insulating material layer 130b may be completely removed, and the passivation layer 130 may include only the first inorganic insulating material layer 130a in the non-display area NA. That is, referring to FIGS. 13A to 13C, in the display area DA of FIG. 13A, the passivation layer 130 has a triple-layered structure of the first inorganic insulating material layer 130a, the organic insulating material layer 130b, and the second inorganic insulating material layer 130c, and in the non-display area NA of FIGS. 13B and 13C, the passivation layer 130 has a single-layered structure of the first inorganic insulating material layer 130a.

The passivation layer 130 has the above-mentioned double-layered structure or triple-layered structure in order to improve an adhesive strength between the pixel electrode, which will be formed on the passivation layer 130, and the passivation layer 130 and further in order to improve properties of the thin film transistor Tr. Moreover, it is difficult to form an inorganic insulating material layer as thick as an organic insulating material layer, and in the figures, the inorganic insulating material layer is thinner than the organic insulating material layer. Accordingly, to minimize the parasitic capacitance, the organic insulating material layer is formed to have a relatively thick thickness. Since an adhesive strength between the organic insulating material and a conductive material is less than both between the organic insulating material and the inorganic insulating material and between the inorganic insulating material and the conductive material, an adhesive strength between the pixel electrode of a conductive material and the passivation layer 130 is improved by forming an inorganic insulating material layer between the organic insulating material layer and the conductive material layer. Furthermore, when the active layer 115a, a portion of which is exposed between the source and drain electrodes 120 and 122, contacts an organic insulating material layer, there is a poor interface property such that properties of the thin film transistor Tr are degraded. Accordingly, to prevent degradation in properties of the thin film transistor Tr, an inorganic insulating material layer, which has an excellent interface property with the active layer 115a, may be positioned in a bottom layer of the passivation layer 130.

Figure 4E:
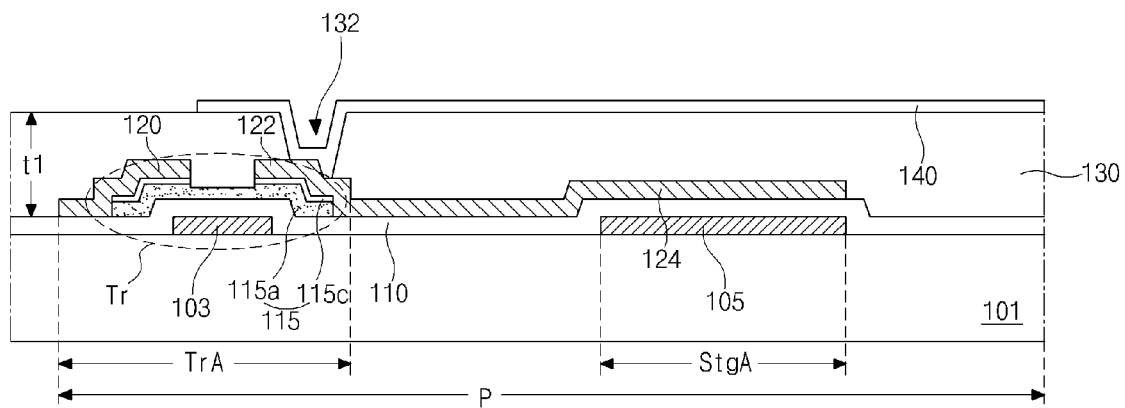
Figure 4F:
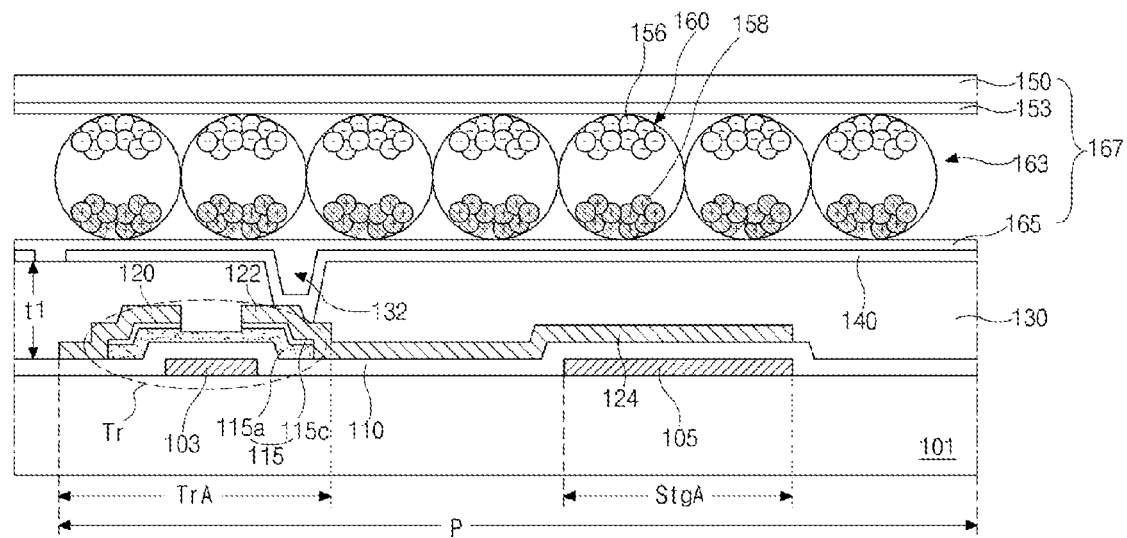
Figure 4G:
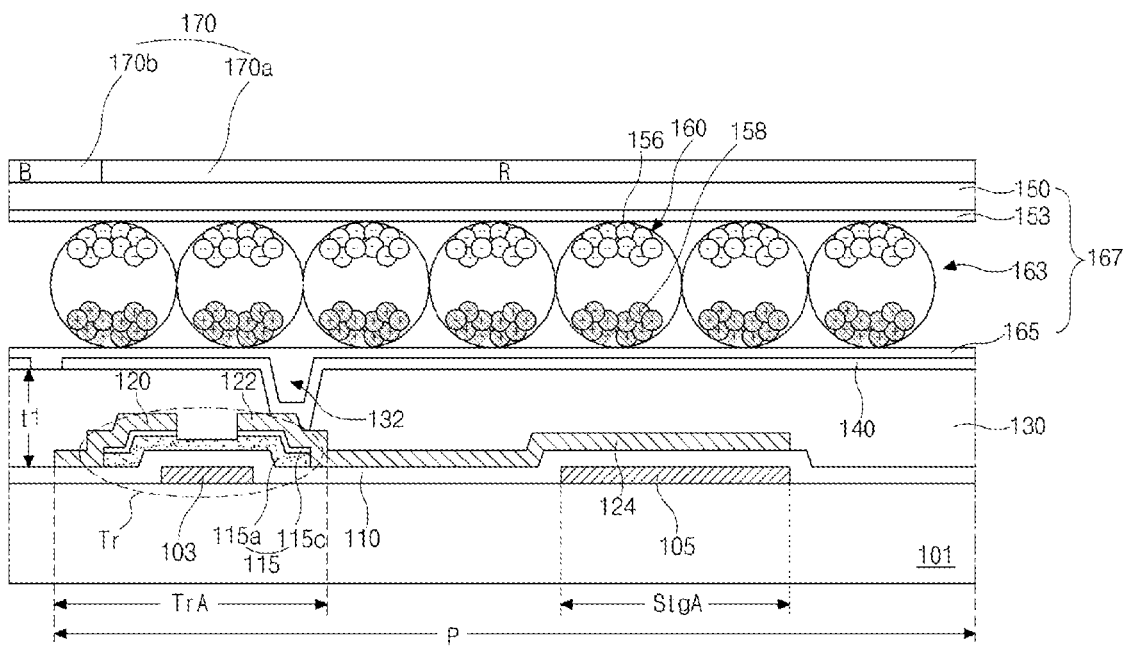
Figure 5E:
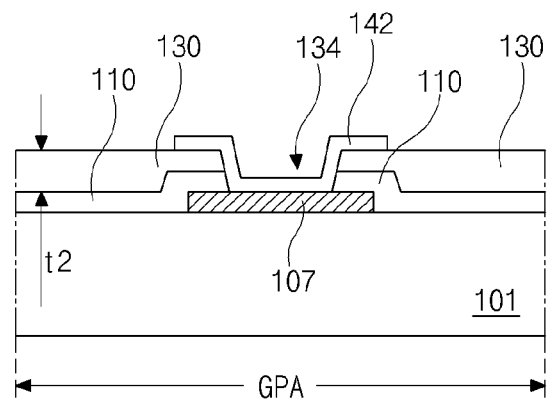
Figure 5F:
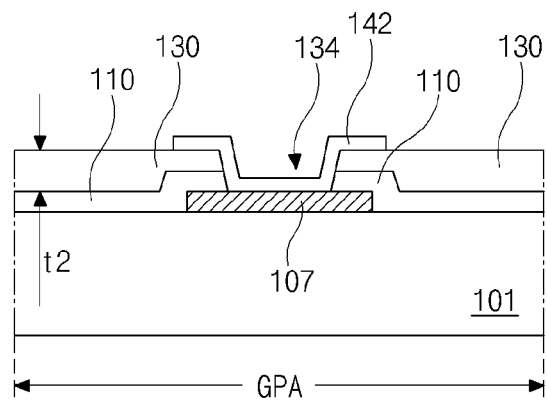
Figure 5G:
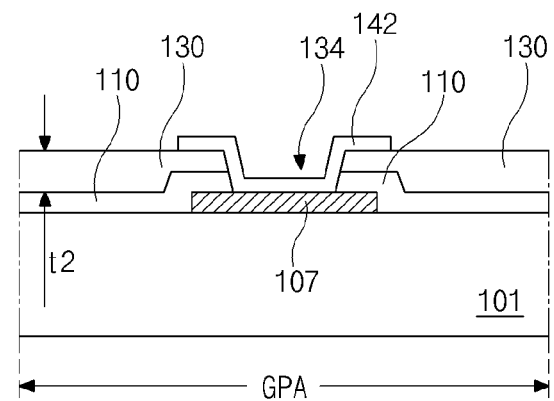
Figure 6E:
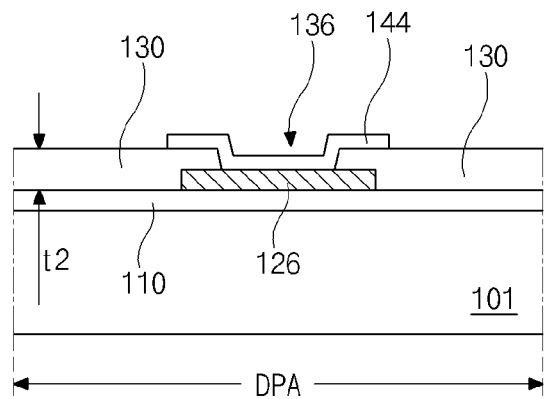
Figure 6F:
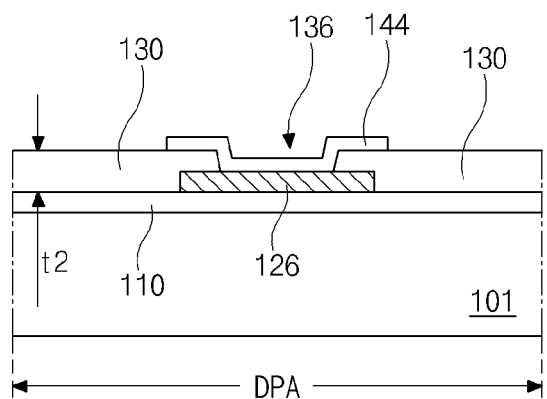
Figure 6G:
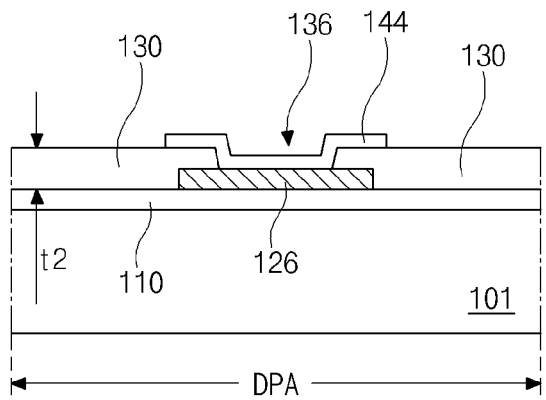

In FIGS. 4E, 5E and 6E, a transparent conductive material, for example, indium-tin-oxide (ITO) or indium-zinc-oxide (IZO), is deposited on the passivation layer 130 to form a transparent conductive material layer (not shown). Next, the conductive material layer is patterned to form a pixel electrode 140 in each pixel region P, a gate auxiliary pad electrode 142 in the gate pad region GPA, and a data auxiliary pad electrode 144 in the data pad region DPA. The pixel electrode 140, the gate auxiliary pad electrode 142 and the data auxiliary pad electrode 144 contact the drain electrode 122, the gate pad electrode 107 and the data pad electrode 126 through the drain contact hole 132, the gate pad contact hole 134 and the data pad contact hole 136, respectively.

As stated above, the pixel electrode 140 completely covers the thin film transistor Tr. Thus, a real display area increases, and the aperture ratio increases. In general, when a pixel electrode entirely covers a thin film transistor, a parasitic capacitance may be generated between an electrode of the thin film transistor Tr, for example, a source electrode and the pixel electrode. However, in the present invention, since the passivation layer 130 includes an organic insulating material and has a thickness of more than 2.5 micrometers, the parasitic capacitance is minimized, and the image qualities are prevented from being lowered. The thickness of the passivation layer 130 may be within a range of about 2.5 to about 5 micrometers.

Figure 14:
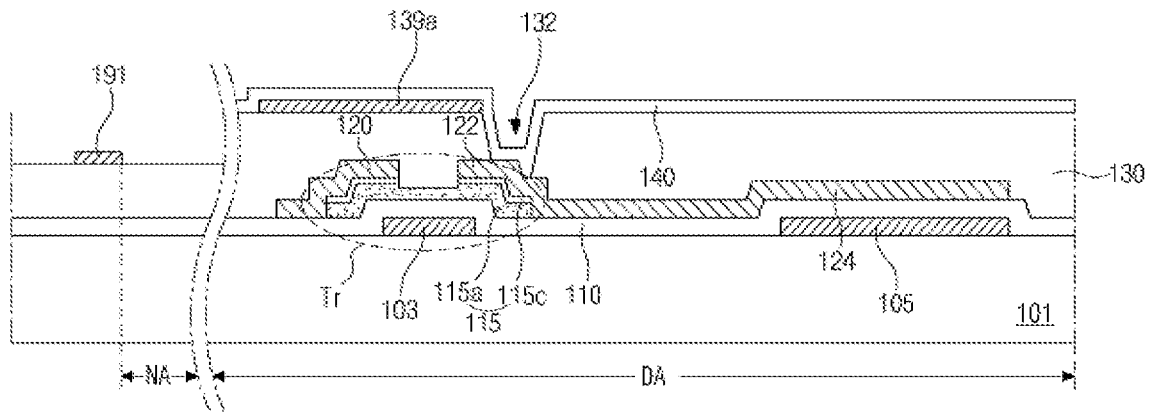
FIG. 14 is a cross-sectional view of illustrating an electrophoretic display device including a pixel electrode according to another embodiment of the present invention.

Meanwhile, FIG. 14 is a cross-sectional view of illustrating an electrophoretic display device including a pixel electrode according to another embodiment of the present invention. In FIG. 14, an opaque metallic material, for example, molybdenum (Mo), is deposited on the passivation layer 130 and is patterned to form a light-blocking pattern 139a covering the thin film transistor Tr. A transparent conductive material is formed on the light-blocking pattern 139a and is patterned to form a pixel electrode 140. In the electrophoretic display device, light passes through an electrophoresis film and goes into a channel region of the thin film transistor Tr, which is the active layer 115a exposed between the source and drain electrodes 120 and 122. Thus, photocurrents are generated, and the characteristics of the thin film transistor Tr are lowered. In another embodiment of the present invention, the light-blocking pattern 139a is formed to screen the thin film transistor, more particularly, the channel region, and the problem can be prevented. In addition, an align mark 191 can be formed during the step for forming the light-blocking pattern 139a. In the figure, even though the light-blocking pattern 139a is formed outside the non-display area NA, the light-blocking pattern 139a may be formed in the non-display area NA. When the align mark for aligning the color filter layer is not formed during the gate line forming step and the data line forming step, the align mark is formed in this step. If the align mark is formed from the transparent conductive material, it is very difficult to use the align mark of the transparent conductive material for aligning the color filter layer, and the opaque conductive material is further formed.

On the other hand, when the align mark for aligning the color filter layer is not formed during the gate line forming step and the data line forming step, the pixel electrode 140 may be formed by depositing an opaque metallic material such as molybdenum-titanium (MoTi) and then patterning it. At the same time, the align mark for aligning the color filter layer may be formed in the non-display area NA. Here, the pixel electrode 140 may entirely cover the thin film transistor Tr, and the characteristics of the thin film transistor can be prevented from being lowered.

Figure 10A:
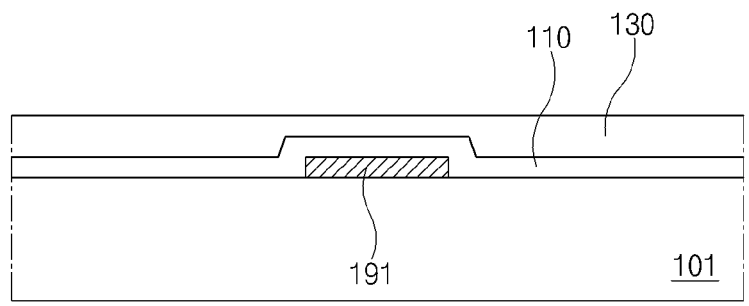
FIGS. 10A to 10C are cross-sectional views each illustrating a position of an align mark for aligning a color filter layer of an electrophoretic display device according to an embodiment of the present invention.
Figure 10B:
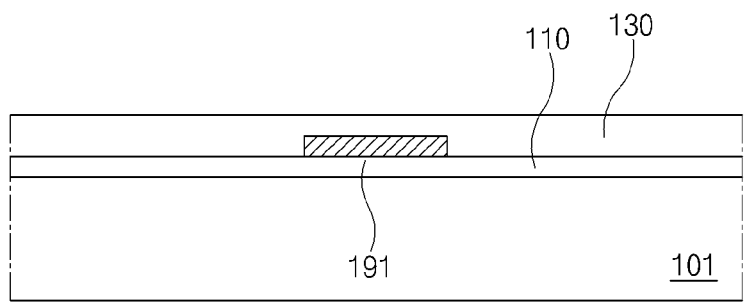
Figure 10C:
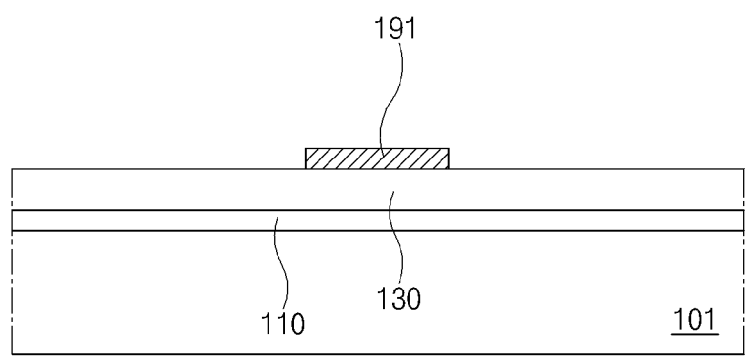

FIGS. 10A to 10C are cross-sectional views each illustrating a position of an align mark for aligning a color filter layer of an electrophoretic display device according to an embodiment of the present invention. FIG. 10A shows a position of the align mark formed during a gate line forming step, FIG. 10B shows a position of the align mark formed during a data line forming step, and FIG. 10C shows a position of the align mark formed during a pixel electrode forming step.

In FIG. 10A, when the align mark 191 is formed during the gate line forming step, the align mark 191 is positioned on the substrate 101 and covered with the gate insulating layer 110. In FIG. 10B, when the align mark 191 is formed during the data line forming step, the align mark 191 is positioned on the gate insulating layer 110 and covered with the passivation layer 130. In FIG. 10C, when the align mark 191 is formed during the pixel electrode forming step, the align mark 191 is positioned on the passivation layer 130. FIGS. 10A to 10C show the align mark 191 of a single layer. However, when the gate line, the data line and the pixel electrode 140 have a double-layered or triple-layered structure, the align mark 191 also has a double-layered or triple-layered structure.

In FIGS. 4F, 5F, 6F and 7B, an electrophoresis film 167 is attached onto the pixel electrode 140. The electrophoresis film 167 corresponds to the display area DA. The electrophoresis film 167 includes a base film 150 of a transparent and flexible material, such as polyethylene terephthalate (PET), a common electrode 153 under the base film 150, an ink layer 163 under the common electrode 153, and an adhesive layer 165 under the ink layer 163. When the electrophoresis film 167 is attached onto the pixel electrode 140, the ink layer 163 is positioned between the common and pixel electrodes 153 and 140, and the adhesive layer 165 faces the pixel electrode 140. The common electrode 153 is formed of a transparent conductive material. The ink layer 163 includes a plurality of capsules 160, and each capsule 160 has a plurality of white-dyed particles 156 and a plurality of black-dyed particles 158 therein. The white-dyed and black-dyed particles 156 and 158 may be negatively and positively charged by a condensation polymerization reaction, respectively.

The electrophoresis film 167 may have a different structure from the above-mentioned structure. For example, the ink layer 163 may include only one of the white-dyed particles 156 and the black-dyed particles 158. Although not shown in the figures, when the ink layer 163 has only one of the white-dyed particles 156 and the black-dyed particles 158, the common electrode may be formed in the same layer as the pixel electrode on the passivation layer 130. Namely, differently from the structure shown in FIG. 4F, the common electrode may be not formed on an entire surface of the ink layer 163. In this case, the pixel electrode may have a plurality of bar-shaped patterns, and the common electrode also may have a plurality of bar-shaped patterns. The bar-shaped patterns of common electrode may be alternately arranged with the bar-shaped patterns of the pixel electrode. A common line, which is parallel to the gate line, may be formed during the gate line forming step, and a common contact hole exposing a portion of the common line may be formed in the passivation layer 130 and the gate insulating layer 110. The common electrode may contact the common line through the common contact hole.

The electrophoresis film 167, beneficially, has a whole thickness of about 300 micrometers to about 500 micrometers. If a step difference between a layer on which the align mark 191 is formed and a top layer of the electrophoresis film 167 is above 500 micrometers, there may be some difficulties to use the align mark 191 for aligning the color filter layer which will be formed on the electrophoresis film 167. Accordingly, it is desirable that the electrophoresis film 167 has the thickness within the above-mentioned range.

Here, the base film 150 of PET has a thickness of less than 50 micrometers. If the base film 150 is too thick, there may be a parallax problem that an image for a pixel will be shown in a next pixel. Accordingly, to prevent this, the base film 150 may have a thickness of about 10 micrometers to about 50 micrometers. Beneficially, the thickness of the base film 150 may be less than 30 micrometers. However, the thickness of the base film 150 may vary according to the size of the display device.

When the common electrode 153 is formed on the ink layer 163 together with the base film 150, the common electrode 153 has a thickness of less than about 2 micrometers, and thus there is no parallax problem due to this.

In FIGS. 4G, 5G, 6G and 7C, a red color filter layer (not shown) is formed on the base film 150 of the electrophoresis film 167 in the display area DA by applying a red color resist. For example, the red color resist is applied by a spin coating method. After exactly aligning the red color filter layer with the align mark 191, the red color filter layer is exposed to light through a mask having a light-transmitting area, which transmits light, and a light-blocking area, which blocks light, and then is developed to form a red (R) color filter pattern 170a. The red (R) color filter pattern 170a corresponds to some pixel regions P. Since the red color resist is a negative type, a portion of the red color filter layer, where light is irradiated, remains onto the base film 150 and a portion of the red color filter layer, where light is not irradiated, is removed.

As stated above, when the gate pad electrode 107 has the aluminum alloy (AlNd) as the upper layer, to prevent the damage of the upper layer, the developer may include KOH having a concentration of less than 0.1 wt %.

Next, a green (G) color filter pattern 170b and a blue (B) color filter pattern 170c are formed on the base film 150 by the same process as the red (R) color filter pattern 170a forming process. The red (R), green (G) and blue (B) color filter patterns 170a, 170b and 170c are sequentially repeated. Each of the red (R), green (G) and blue (B) color filter patterns 170a, 170b and 170c is disposed in each pixel region P. The color filter layer 170 is formed by one of a photolithography process, an inkjet printing process and a roll printing process.

The color filter layer 170 may further include a white (W) color filter pattern in addition to the red (R), green (G) and blue (B) color filter patterns 170a, 170b and 170c. The white (W) color filter pattern is formed by applying and patterning a colorless resist. In this case, the red (R), green (G), blue (B) and white (W) color filter patterns are disposed in four pixel regions of a 2 by 2 matrix shape, wherein the four pixel regions are adjacent to each other up and down and left and right.

In the present invention, the color filter layer 170 is formed under temperatures of about 25 to about 100 degrees of Celsius. More particularly, in the present invention, since the color filter layer 170 is formed directly on the electrophoresis film 167, the ink layer 163 of the electrophoresis film 167 may be damaged if the color filter layer 170 is formed under relatively high temperatures. Therefore, to prevent this, it is desirable to form the color filter layer 170 under temperatures of less than about 100 degrees of Celsius, and more beneficially, less than 70 degrees of Celsius. In a conventional LCD device, since an alignment layer is formed on a color filter layer and cured under the temperature of about 230 degrees of Celsius, the color filter is formed under temperatures similar to the curing temperature. However, in the present invention, if the color filter layer is formed under temperatures similar to the curing temperature, the ink layer 163 of the electrophoresis film 167 can be damaged, and the color filter layer is formed under temperatures of less than about 100 degrees of Celsius. To form the color filter layer 170 under relatively low temperatures, the color resist may include epoxy and acrylic binder. The epoxy may be about 20 to 40 wt %, and the acrylic binder may be about 60 to 80 wt %. The color resist may further include pigments for coloring. The resist for the white color filter pattern may include epoxy and acrylic binder without pigments. The white color filter pattern may be formed of an organic material having high transmittance such as photo-acryl or BCB.

In the color resist of the present invention, the percentage of the epoxy is relatively high as compared with the color resist of the related art. The process temperature can be lowered by increasing the proportion of the epoxy. That is, in the present invention, the color filter layer 170 is formed under the temperatures of less than 100 degrees of Celsius by using the color resist, which includes the high percentage of the epoxy, and the color filter layer 170 can be formed directly on the electrophoresis film 167 without damages.

The color filter patterns may be formed by one of a photolithography process, an inkjet printing process and a roll printing process. With the inkjet printing process or the roll printing process, the color filter patterns can be formed in each pixel regions P without the patterning process for forming each color filter pattern.

Before forming the color filter layer 170, a black matrix (not shown) may be formed at a border region of each pixel region P. The black matrix may correspond to the gate line and data line. A black resin layer is applied on the base film 150, or a black-color based metallic material layer is deposited on the base film 150. The black-color based metallic material layer may be formed of chrome (Cr). The black resin layer or the black-color based metallic material layer is patterned to thereby form the black matrix.

Figure 15A:
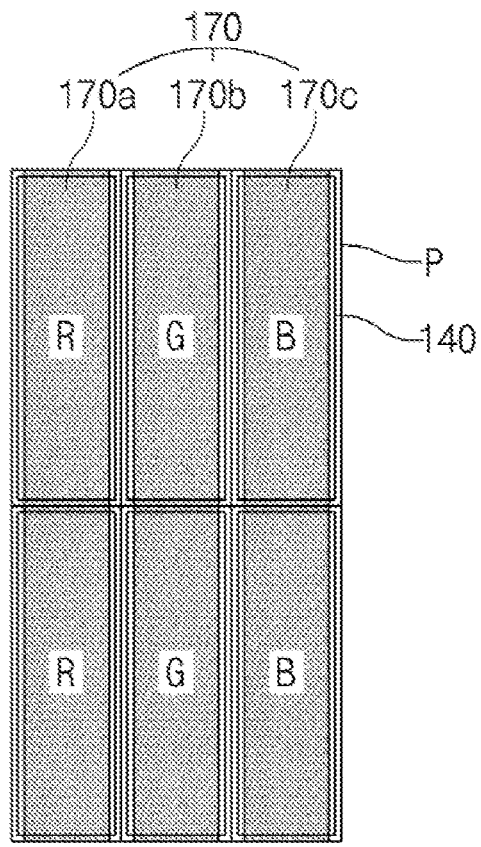
FIGS. 15A and 15B are plan views of illustrating structures of color filter patterns according to the present invention.
Figure 15B:
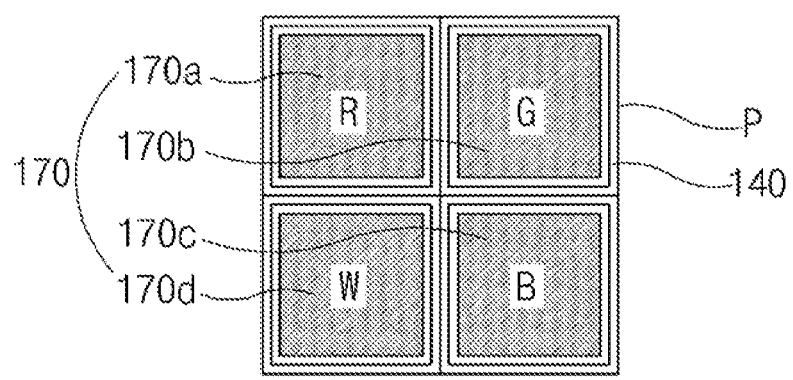

FIGS. 15A and 15B are plan views of illustrating structures of color filter patterns according to the present invention. FIG. 15A shows a stripe-type structure of red (R), green (G) and blue (B) color filter patterns. FIG. 15B shows a quad-type structure of red (R), green (B), blue (B) and white (W) color filter patterns.

In FIG. 15A, the pixel electrode 140 is formed in each of the pixel regions P defined by crossing of the gate lines and the data lines. Among the pixel regions P, the red (R) color filter pattern 170a is positioned in a (3n−2)th column, the green (G) color filter pattern 170b is positioned in a (3n−1)th column, and the blue (B) color filter pattern 170c is positioned in a (3n)th column in the context of the figure, wherein n is a natural number. Namely, the red (R), green (G) and blue (B) color filter patterns 170a, 170b and 170c are alternately arranged along a horizontal direction in the context of the figure. Here, each of the color filter patterns 170a, 170b and 170c has the same length as the pixel region P and a smaller width than the pixel region P. The pixel electrode 140 has a length and a width smaller than the pixel region. The width of the color filter patterns 170a, 170b and 170c is the same as the width of the pixel electrode 140. The color filter patterns having the same color are continuously formed along a vertical direction in the context of the figure, and the color filter patterns having different colors are spaced apart from each other along the horizontal direction in the context of the figure. The above-mentioned structure is to prevent mixing between different colors of adjacent color filter patterns and lowering of the color purity.

Meanwhile, in FIG. 15B, the red (R), green (G), blue (B) and white (W) color filter patterns 170a, 170b, 170c and 170d are disposed in four pixel regions of a 2 by 2 matrix shape and constitute the color filter layer 170. The pixel electrode 140 has a length and a width smaller than the pixel region P. Each of the color filter patterns 170a, 170b, 170c and 170d has a length and a width equal to or smaller than the pixel electrode 140. This structure is also to prevent mixing between different colors of adjacent color filter patterns and lowering of the color purity.

Figure 4H:
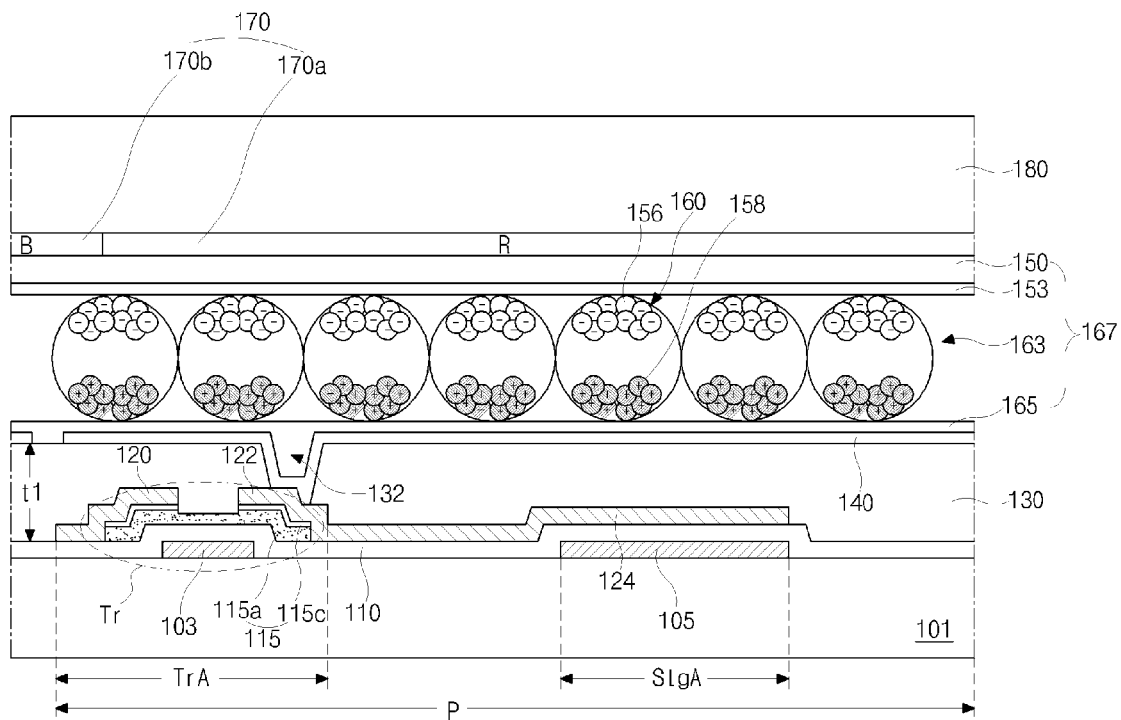
Figure 5H:
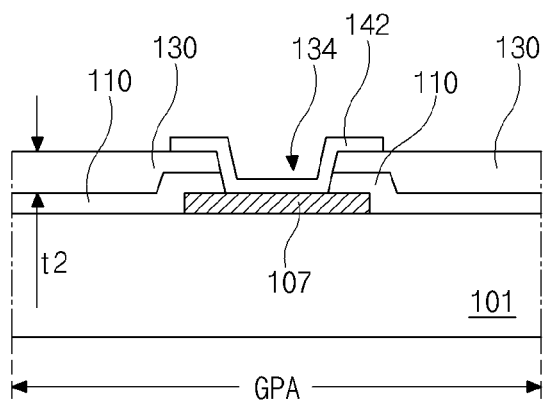
Figure 6H:
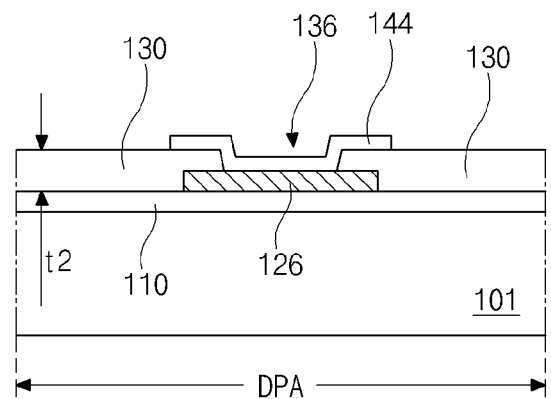

In FIGS. 4H, 5H and 6H, a protection sheet 180 of a plastic material having a transparent and flexible property is positioned over the color filter layer 170. A seal pattern (not shown) is formed along the non-display area NA at a periphery of the display area DA. The protection sheet 180 is attached to the substrate 101 such that the protection sheet 180 covers the display area DA. The protection sheet 180 is attached to expose the gate auxiliary pad electrode 142 and the data auxiliary pad electrode 144.

Next, although not shown, to protect the electrophoresis film 167, sides of the electrophoresis film 167 may be sealed after the protection sheet 180 is attached. In addition, the substrate 101 may be cut along the cutting line to remove a portion CA where the align mark 191 is formed. The portion CA may be an outer region of the non-display area NA. An ACF (not shown) may be attached onto the gate auxiliary pad electrode 142 and the data auxiliary pad electrode 144, and the ACF may be joined with a TCP (not shown) electrically connected to an external driving circuit substrate (not shown). By the above modulated process, an electrophoretic display device according to the present invention is obtained.

Figure 11C:
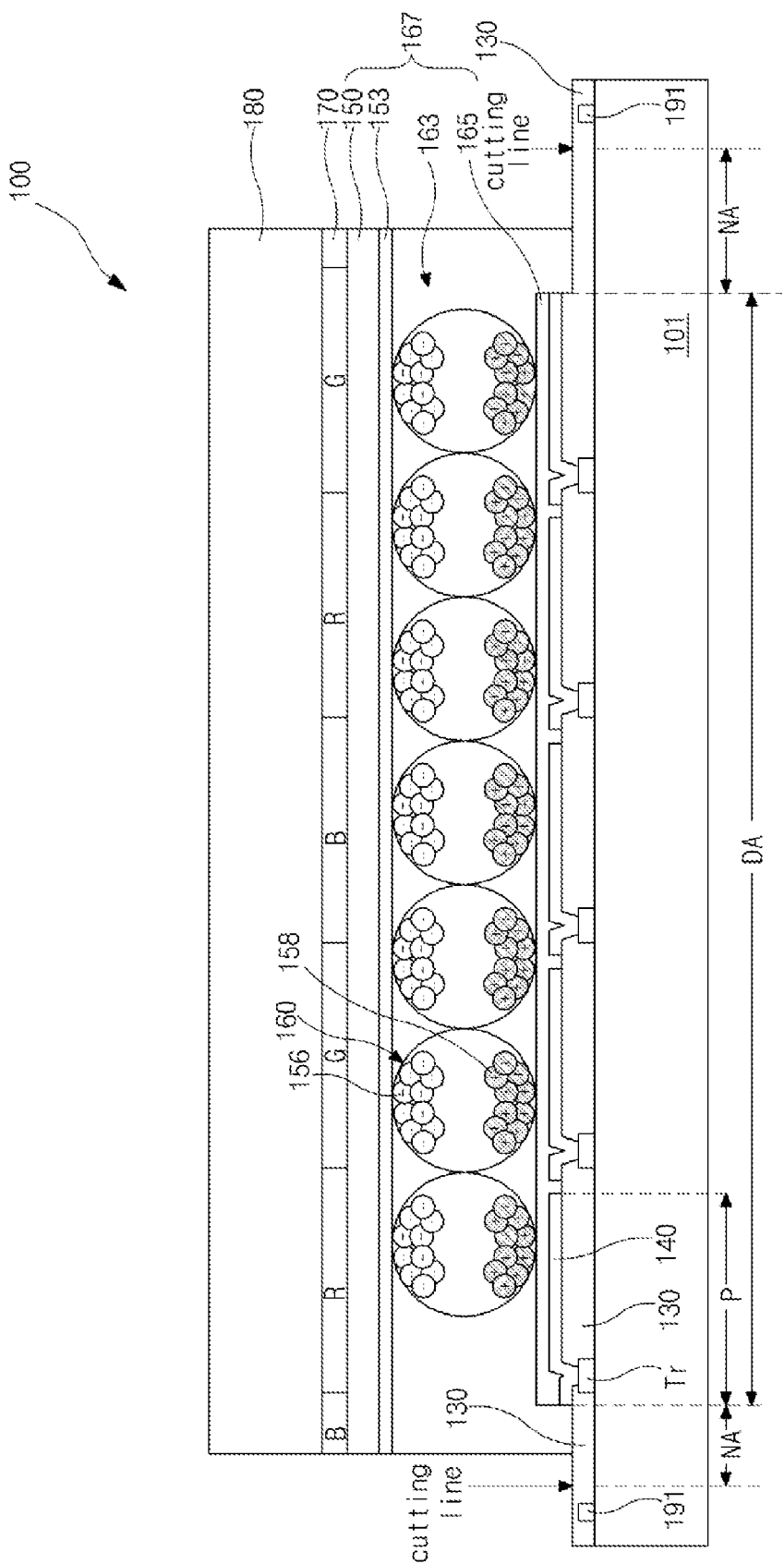

FIGS. 11A to 11C are cross-sectional views schematically showing an electrophoretic display device in steps of a fabricating process according to another embodiment of the present invention.

In FIG. 11A, the thin film transistor Tr, the align mark 191 for aligning the color filter layer, the passivation layer 130, which has difference thicknesses at the display area DA and the non-display area NA, and the pixel electrode 140 in each pixel region P are formed on the substrate 101. Since fabricating steps for each element are already explained, detail explanations are omitted. In FIG. 11A, the align mark 191 is formed at a step of forming the gate line (not shown) and the gate electrode (not shown) of the thin film transistor Tr.

In FIG. 11B, the electrophoresis film 167 including the adhesive layer 165, the ink layer 163, the common electrode 153 and the base film 150 is attached onto the substrate 101 where the pixel electrode 140 is formed. The electrophoresis film 167 corresponds to the display area DA. In FIG. 11B, the ink layer 163 includes a plurality of capsules 160, and each capsule 160 has a plurality of white-dyed particles 156 and a plurality of black-dyed particles 158 therein. The white-dyed and black-dyed particles 156 and 158 may be negatively and positively charged by a condensation polymerization reaction, respectively. However, the ink layer 163 may have only one of the white-dyed particles 156 and the black-dyed particles 158. In this case, the common electrode 153 in the electrophoresis film 167 is omitted, while the common electrode is formed on the substrate 101. The common electrode may be formed in the same layer as the pixel electrode on the passivation layer 130. The pixel electrode has a plurality of bar-shaped patterns, and the common electrode also has a plurality of bar-shaped patterns. The bar-shaped patterns of common electrode are alternately arranged with the bar-shaped patterns of the pixel electrode.

In FIG. 11C, the color filter layer 170 including the sequentially repeated red (R), green (G) and blue (B) color filter patterns is formed on the electrophoresis film 167 using the align mark 191. The color filter layer 170 may further include a white (W) color filter pattern with the red (R), green (G) and blue (B) color filter patterns. The red (R), green (G), blue (B) and white (W) color filter patterns are disposed in four pixel regions of a 2 by 2 matrix shape, wherein the four pixel regions are adjacent to each other up and down and left and right.

Next, the protection sheet 180 is formed on the color filter layer 170, and a portion of the substrate 101, where the align mark 191 is formed, is removed by cutting along the cutting line. An ACF (not shown) is attached onto the gate auxiliary pad electrode 142 and the data auxiliary pad electrode 144, and the ACF is joined with a TCP (not shown) electrically connected to an external driving circuit substrate (not shown). By the above modulated process, an electrophoretic display device 100 according to the present invention is obtained.

In the above-mentioned fabricating process for the electrophoretic display device, a carrier substrate, which is essential in a fabricating process for the related art electrophoretic display device, is not required. In addition, adhesive layers for attaching the carrier substrate are not required. Accordingly, production costs are reduced.

Moreover, since the color filter layer is formed directly on the electrophoresis film, a substrate for the color filter layer is not required. In this case, a mis-aligning range in the electrophoretic display device according to the present invention, where the color filter layer is directly on the electrophoresis film, is about 2 micrometers smaller than a mis-aligning range of about 5 micrometers in the related art electrophoretic display device, where the color filter layer is formed another substrate. Accordingly, problems in aligning are minimized, and there is an advantage in an aligning property.

Furthermore, since detaching processes for unessential elements are not required, problems, for example, scratches, can be prevented.

In addition, since the passivation layer has different thicknesses at the display area and the non-display area, electrical short circuit problems can be prevented, and a parasitic capacitance can be minimized.

The color filter layer is formed directly on the electrophoresis film under temperatures of less than 100 degrees of Celsius, and beneficially, of less than 70 degrees of Celsius, and the electrophoresis film is not damaged.

Since the pixel electrode entirely covers the thin film transistor, the aperture ratio increases. The parasitic capacitance between the pixel electrode and the thin film transistor is solved because the passivation layer has more than about 3 micrometers.

The base film of the electrophoresis film has a thickness of less than 30 micrometers, and the parallax problem that an image in a pixel region is shown in a next pixel region is prevented.

Figure 12A:
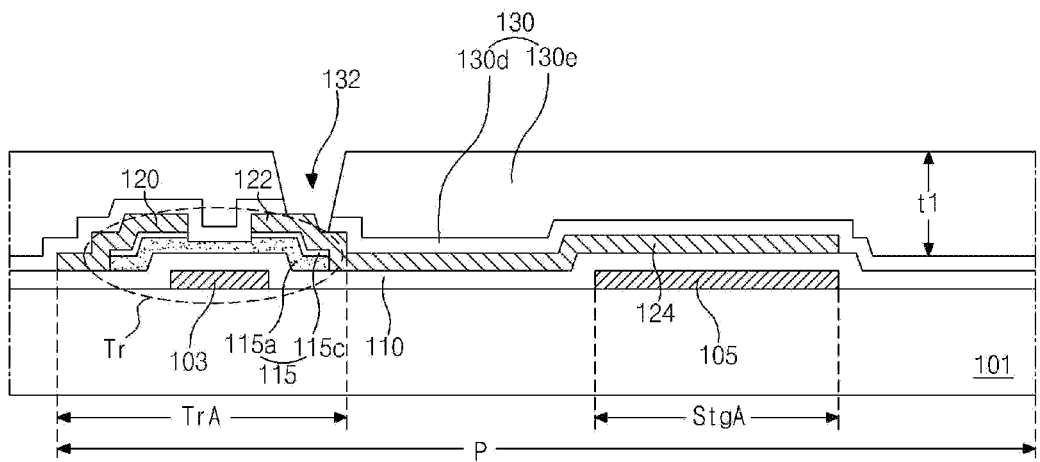
FIGS. 12A to 12C are cross-sectional views for explaining a fabricating process of a passivation layer in a pixel region, a gate pad region and a data pad region of an electrophoretic display device according to another embodiment of the present invention, respectively.
Figure 12B:
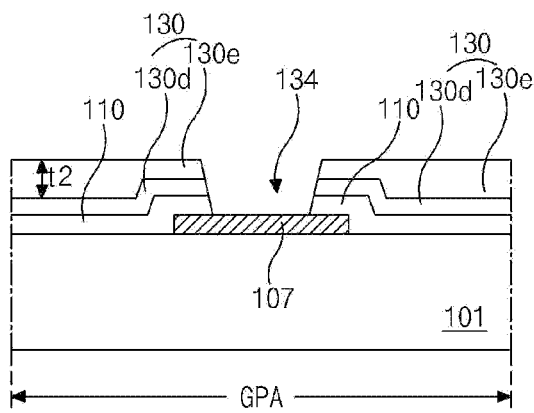
Figure 12C:
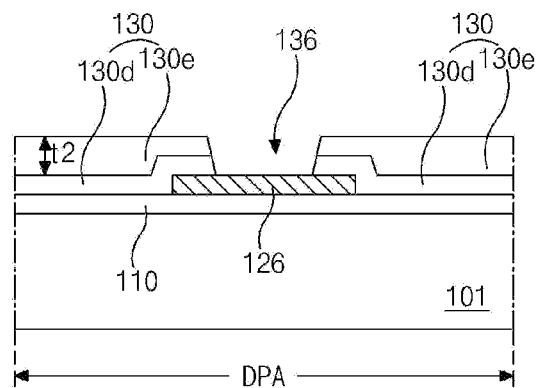

FIGS. 12A to 12C are cross-sectional views for explaining a fabricating process of a passivation layer in a pixel region, a gate pad region and a data pad region of an electrophoretic display device according to another embodiment of the present invention, respectively. Since there is only difference in a passivation layer covering a thin film transistor, an explanation is focused in a fabricating process of the passivation layer. The same parts as the previous embodiment have the same reference numbers.

Referring to FIGS. 12A to 12C, the passivation layer 130 has a double-layered structure. Although FIGS. 8A to 8C show the passivation layer 130 having a double-layered-structure, there is a difference in a stacking order. Referring to FIGS. 8A to 8C, the passivation layer 130 of FIG. 8A in the pixel region P of FIG. 8A has the first layer 130a of FIG. 8A of an organic insulating material and the second layer 130b of FIG. 8a of an inorganic insulating material stacked on the first layer 130a of FIG. 8A. On the other hand, in FIGS. 12A to 12B, the passivation layer 130 in the pixel region P, the gate pad region GPA and the data pad region DPA has a first layer 130d of an inorganic insulating material and a second layer 130e of an organic insulating material stacked on the first layer 130d. For example, the first layer 130d may be formed of silicon oxide ($SiO_2$) or silicon nitride (SiNx), and the second layer 130e may be formed of benzocyclobutene (BCB) or photo-acryl.

Additionally, in the electrophoretic display device of FIGS. 8A to 8C, the second layer 130b, which is formed of an inorganic insulating material, of the passivation layer 130 in the gate pad region GPA and the data pad region DPA is removed such that the passivation layer 130 in the gate pad region GPA and the data pad region DPA has a single-layered structure of the first layer 130a of an organic insulating material. Accordingly, a thickness of the passivation layer 130 in the gate and data pad regions GPA and DPA is smaller than that in the pixel region P. However, in the electrophoretic display device of FIGS. 12A to 12C, the passivation layer 130 not only in the pixel region P but also in the gate and data pad regions GPA and DPA has a double-layered structure. In this case, a thickness of the second layer 130e, which is formed of an organic insulating material, of the passivation layer 130 in the gate and data pad regions GPA and DPA is smaller than that in the pixel region P. On the other hand, the second layer 130e of the passivation layer 130 in the gate and data pad regions GPA and DPA may be completely removed such that the passivation layer 130 in the gate and data pad regions GPA and DPA has a single-layered structure of an inorganic insulating material.

As stated above, when the passivation layer 130 has a double-layered structure with the first layer 130d as a lower layer of an inorganic insulating material and the second layer 130e as an upper layer 130e of an organic insulating material, there is no photoresist layer for patterning the passivation layer 130. The passivation layer 130 is directly patterned by exposing and developing the second layer 130e without the photoresist layer because the second layer 130e of an organic insulating material is photosensitive.

Namely, a diffraction exposing process or a half-tone exposing process is performed onto the passivation layer 130 having a double-layered structure of the first and second layers 130d and 130e using a scanning-type exposing unit (not shown), or two steps exposing process including a blank shot is performed onto the passivation layer 130 having a double-layered structure of the first and second layers 130d and 130e using a stepper-type exposing unit (not shown). Then, the second layer 130e of the passivation layer 130 is developed such that the second layer 130e of the passivation layer 130 in the display area DA including the pixel region P has a first thickness t1 and the second layer 130e of the passivation layer 130 in the non-display area including the gate and data pad regions GPA and DPA has a second thickness t2 smaller than the first thickness t1. In addition, a portion of the first layer 130d, which covers each of the drain electrode 122 in the pixel region P, the gate pad electrode 107 in the gate pad region GPA and the data pad electrode 126 in the data pad region DPA, is exposed by removing the second layer 130e. Then, the exposed portion of the first layer 130d is etched such that the drain contact hole 132, the gate pad contact hole 134 and the data pad contact hole 136, which respectively expose the drain electrode 122, the gate pad electrode 107 and the data pad electrode 126, are formed through the first layer 130d. In this case, the passivation layer 130 not only in the pixel region P but also in the gate and data pad regions GPA and DPA has a double-layered structure of the first and second layers 130d and 130e.

On the other hand, when the passivation layer 130 in the non-display area has a single-layered structure, a single dry-etching process is required on the second layer 130e having different thicknesses after the diffraction exposing process or the half-tone exposing process.

That is, the second layer 130e having a first thickness t1 in the pixel region P and a second thickness t2 in the gate and data pad regions GPA and DPA is dry-etched such that the second layer 130e in the gate and data pad regions GPA and DPA are completely removed and the second layer 130e in the pixel region P has a reduced thickness. As a result, the passivation layer 130 in the pixel region P has a double-layered structure, while the passivation layer 130 in the gate and data pad regions GPA and DPA has a single-layered structure.

Since the following processes are substantially the same as processes explained with reference to FIGS. 8A to 8C, explanation for the following processes is omitted.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electrophoretic display device, comprising:
a switching element on a substrate including a display area having a pixel region and a non-display area at a periphery of the display area;
a passivation layer covering the switching element;
a pixel electrode on the passivation layer and connected to the switching element;
an electrophoresis film on the pixel electrode and including an ink layer and a base film, wherein the ink layer includes a plurality of charged particles, and the base film is formed of polyethylene terephthalate;
a common electrode disposed between the base film and the ink layer for generating an electric field with the pixel electrode to drive the electrophoresis film; and
a color filter layer directly on the electrophoresis film, wherein the color filter layer is formed under temperatures of less than 100 degrees of Celsius,
wherein the color filter layer includes red, green and blue color filter patterns, and the red, green and blue color filter patterns are formed of color resists including red, green and blue pigments, respectively, wherein each of the color resists includes epoxy of 20 to 40 wt % and acrylic binder of 60 to 80 wt %, and
wherein the pixel electrode has a length and a width smaller than the pixel region, each of the red, green and blue color filter patterns has a same length as the pixel region, and each of the red, green and blue color filter patterns has a width equal to or smaller than the pixel electrode, and wherein the red, green and blue color filter patterns are sequentially and alternately arranged along a direction parallel to the width.

2. An electrophoretic display device, comprising:
a switching element on a substrate including a display area having a pixel region and a non-display area at a periphery of the display area;
a passivation layer covering the switching element;
a pixel electrode on the passivation layer and connected to the switching element;
an electrophoresis film on the pixel electrode and including an ink layer and a base film, wherein the ink layer includes a plurality of charged particles, and the base film is formed of polyethylene terephthalate;
a common electrode disposed between the base film and the ink layer for generating an electric field with the pixel electrode to drive the electrophoresis film; and
a color filter layer directly on the electrophoresis film, wherein the color filter layer is formed under temperatures of less than 100 degrees of Celsius,
wherein the color filter layer includes red, green and blue color filter patterns, and the red, green and blue color filter patterns are formed of color resists including red, green and blue pigments, respectively, wherein each of the color resists includes epoxy of 20 to 40 wt % and acrylic binder of 60 to 80 wt %, and
wherein the color filter layer further includes a white color filter pattern, and the white color filter pattern is formed one of photo-acryl and benzocyclobutene,
wherein the pixel electrode has a length and a width smaller than the pixel region, and each of the red, green, blue and white color filter patterns has a length and a width equal to or smaller than the pixel electrode, wherein the red, green, blue and white color filter patterns are arranged in a 2 by 2 matrix shape.

3. An electrophoretic display device, comprising:
a switching element on a substrate including a display area having a pixel region and a non-display area at a periphery of the display area;
a passivation layer covering the switching element;
a pixel electrode on the passivation layer and connected to the switching element;
an electrophoresis film on the pixel electrode and including an ink layer and a base film, wherein the ink layer includes a plurality of charged particles, and the base film is formed of polyethylene terephthalate;
a common electrode disposed between the base film and the ink layer for generating an electric field with the pixel electrode to drive the electrophoresis film; and
a color filter layer directly on the electrophoresis film, wherein the color filter layer is formed under temperatures of less than 100 degrees of Celsius,
wherein the passivation layer has a first thickness corresponding to the display area and a second thickness corresponding to the non-display area smaller than the first thickness, and
wherein the passivation layer includes a double-layered structure having an inorganic insulating material layer and a first organic insulating material layer of a third thickness sequentially stacked in the display area, and the passivation layer includes a single-layered structure having the inorganic insulating material layer or a double-layered structure having the inorganic insulating material layer and a second organic insulating material layer of a fourth thickness smaller than the third thickness in the non-display area.

4. The device according to claim 3, wherein the passivation layer includes a contact hole exposing a portion of the switching element, and the pixel electrode is connected to the switching element through the contact hole, wherein the pixel electrode on the passivation layer entirely overlaps the switching element.

5. The device according to claim 4, wherein the passivation layer is formed of an organic insulating material, and the first thickness is more than 2.5 micrometers.

6. The device according to claim 4, wherein the pixel electrode is formed of an opaque metallic material selected from a group including molybdenum-titanium.

7. The device according to claim 4, further comprising a light-blocking pattern between the passivation layer and the pixel electrode, wherein the light-blocking pattern overlaps the switching element and is formed of an opaque metallic material selected from a group including molybdenum.

8. An electrophoretic display device, comprising:
a switching element on a substrate including a display area having a pixel region and a non-display area at a periphery of the display area;
a passivation layer covering the switching element;
a pixel electrode on the passivation layer and connected to the switching element;
an electrophoresis film on the pixel electrode and including an ink layer and a base film, wherein the ink layer includes a plurality of charged particles, and the base film is formed of polyethylene terephthalate;
a common electrode disposed between the base film and the ink layer for generating an electric field with the pixel electrode to drive the electrophoresis film; and
a color filter layer directly on the electrophoresis film, wherein the color filter layer is formed under temperatures of less than 100 degrees of Celsius,
wherein the passivation layer has a first thickness corresponding to the display area and a second thickness corresponding to the non-display area smaller than the first thickness,
wherein the passivation layer includes a double-layered structure having a first organic insulating material layer of a third thickness and an inorganic insulating material layer sequentially stacked in the display area, and the passivation layer includes a single-layered structure having a second organic insulating material layer of a fourth thickness smaller than the third thickness in the non-display area.

9. An electrophoretic display device, comprising:
a switching element on a substrate including a display area having a pixel region and a non-display area at a periphery of the display area;
a passivation layer covering the switching element;
a pixel electrode on the passivation layer and connected to the switching element;
an electrophoresis film on the pixel electrode and including an ink layer and a base film, wherein the ink layer includes a plurality of charged particles, and the base film is formed of polyethylene terephthalate;
a common electrode disposed between the base film and the ink layer for generating an electric field with the pixel electrode to drive the electrophoresis film; and
a color filter layer directly on the electrophoresis film, wherein the color filter layer is formed under temperatures of less than 100 degrees of Celsius,
wherein the passivation layer has a first thickness corresponding to the display area and a second thickness corresponding to the non-display area smaller than the first thickness, and
wherein the passivation layer includes a triple-layered structure having a first inorganic insulating material layer, a first organic insulating material layer of a third thickness and a second inorganic insulating material layer in the display area, and the passivation layer includes a double-layered structure having the first inorganic insulating material layer and a second organic insulating material layer of a fourth thickness smaller than the third thickness in the non-display area.

10. An electrophoretic display device, comprising:
a switching element on a substrate including a display area having a pixel region and a non-display area at a periphery of the display area;
a passivation layer covering the switching element;
a pixel electrode on the passivation layer and connected to the switching element;
an electrophoresis film on the pixel electrode and including an ink layer and a base film, wherein the ink layer includes a plurality of charged particles, and the base film is formed of polyethylene terephthalate;
a common electrode disposed between the base film and the ink layer for generating an electric field with the pixel electrode to drive the electrophoresis film; and
a color filter layer directly on the electrophoresis film, wherein the color filter layer is formed under temperatures of less than 100 degrees of Celsius,
wherein the passivation layer has a first thickness corresponding to the display area and a second thickness corresponding to the non-display area smaller than the first thickness, and
wherein the passivation layer includes a triple-layered structure having a first inorganic insulating material layer, an organic insulating material layer and a second inorganic insulating material layer in the display area, and the passivation layer includes a single-layered structure having the first inorganic insulating material layer in the non-display area.

11. The device according to claim 1, wherein the color filter layer is formed by one of a photolithography process, an inkjet printing process and a roll printing process.

12. The device according to claim 1, wherein the base film has a thickness of less than 30 micrometers, and the base film is formed of polyethylene terephthalate.

13. The device according to claim 1, further comprising:
a gate line along a first direction in the display area and connected to a first electrode of the switching element;
a data line along a second direction in the display area and connected to a second electrode of the switching element;
a gate pad electrode in the non-display area and connected to an end of the gate line; and
a data pad electrode in the non-display area and connected to an end of the data line,
wherein the passivation layer includes a gate pad contact hole exposing the gate pad electrode and a data pad contact hole exposing the data pad contact hole.

14. The device according to claim 1, wherein the electrophoresis film further includes an adhesive layer contacting the pixel electrode, and the ink layer is disposed between the common electrode and the adhesive layer.

15. The device according to claim 1, wherein the ink layer includes a plurality of capsules, each of which has a plurality of white-dyed particles and a plurality of black-dyed particles charged by a condensation polymerization reaction.

16. The device according to claim 1, further comprising a protection sheet covering the color filter layer.

* * * * *